United States Patent
Park et al.

(10) Patent No.: US 12,273,517 B2
(45) Date of Patent: *Apr. 8, 2025

(54) IMAGE SEGMENTATION METHOD AND APPARATUS FOR IMAGE ENCODING AND DECODING

(71) Applicant: SAMSUNG ELECTRONICS CO., LTD., Suwon-si (KR)

(72) Inventors: Minsoo Park, Suwon-si (KR); Chanyul Kim, Suwon-si (KR); Minwoo Park, Suwon-si (KR); Seungsoo Jeong, Suwon-si (KR); Kiho Choi, Suwon-si (KR); Narae Choi, Suwon-si (KR); Woongil Choi, Suwon-si (KR); Anish Tamse, Suwon-si (KR); Yin-Ji Piao, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/397,484

(22) Filed: Dec. 27, 2023

(65) Prior Publication Data

US 2024/0129464 A1 Apr. 18, 2024

Related U.S. Application Data

(63) Continuation of application No. 18/101,953, filed on Jan. 26, 2023, now Pat. No. 11,917,151, which is a
(Continued)

(51) Int. Cl.
*H04N 11/02* (2006.01)
*H04N 19/103* (2014.01)
(Continued)

(52) U.S. Cl.
CPC ......... *H04N 19/119* (2014.11); *H04N 19/103* (2014.11); *H04N 19/176* (2014.11);
(Continued)

(58) Field of Classification Search
CPC .................................................. H04N 19/119
(Continued)

(56) References Cited

U.S. PATENT DOCUMENTS 10,110,912 B2 10/2018 Kim et al.
10,390,050 B2 8/2019 An et al.
(Continued)

FOREIGN PATENT DOCUMENTS

CN 107079160 A 8/2017
JP 2015-508953 A 3/2015
(Continued)

OTHER PUBLICATIONS

Communication dated Apr. 16, 2024, issued by the China National Intellectual Property Administration in Chinese Application No. 201980040716.5.
(Continued)

*Primary Examiner* — Leron Beck
(74) *Attorney, Agent, or Firm* — Sughrue Mion, PLLC

(57) ABSTRACT

Provided is an image decoding method including: determining a first coding block and a second coding block corresponding to the first coding block; when a size of the first coding block is equal to or smaller than a preset size, obtaining first split shape mode information and second split shape mode information from a bitstream; determining a split mode of the first coding block, based on the first split shape mode information, and determining a split mode of the second coding block, based on the second split shape mode information; and decoding a coding block of a first color component which is determined based on the split mode of
(Continued)

the first coding block and a coding block of a second color component which is determined based on the split mode of the second coding block.

3 Claims, 24 Drawing Sheets

Related U.S. Application Data continuation of application No. 17/492,250, filed on Oct. 1, 2021, now Pat. No. 11,595,647, which is a continuation of application No. 17/052,573, filed on Nov. 3, 2020, now Pat. No. 11,140,390, which is a continuation of application No. PCT/KR2019/005662, filed on May 10, 2019.

(60) Provisional application No. 62/669,626, filed on May 10, 2018.

(51) Int. Cl.
  *H04N 19/119* (2014.01)
  *H04N 19/176* (2014.01)
  *H04N 19/184* (2014.01)
  *H04N 19/186* (2014.01)
  *H04N 19/60* (2014.01)

(52) U.S. Cl.
  CPC ......... *H04N 19/184* (2014.11); *H04N 19/186* (2014.11); *H04N 19/60* (2014.11)

(58) Field of Classification Search
  USPC ........................................ 375/240.01–240.29
  See application file for complete search history.

(56) References Cited

U.S. PATENT DOCUMENTS

| | | | |
|---|---|---|---|
| 10,567,759 B2 | 2/2020 | Seregin et al. | |
| 10,582,194 B2 | 3/2020 | Kim et al. | |
| 10,904,525 B2 | 1/2021 | Ryu et al. | |
| 2004/0233989 A1* | 11/2004 | Kobayashi | H04N 19/593 |
| | | | 375/E7.199 |
| 2011/0243219 A1* | 10/2011 | Hong | H04N 19/96 |
| | | | 375/E7.126 |
| 2012/0170648 A1* | 7/2012 | Chen | H04N 19/70 |
| | | | 375/240.03 |
| 2012/0288007 A1* | 11/2012 | Lee | H04N 19/57 |
| | | | 375/E7.243 |
| 2013/0195199 A1 | 8/2013 | Guo et al. | |
| 2013/0272381 A1 | 10/2013 | Guo et al. | |
| 2017/0111646 A1 | 4/2017 | Kim et al. | |
| 2017/0347128 A1 | 11/2017 | Panusopone et al. | |
| 2018/0020241 A1* | 1/2018 | Li | H04N 19/13 |
| 2018/0070110 A1* | 3/2018 | Chuang | H04N 19/134 |
| 2018/0077417 A1* | 3/2018 | Huang | H04N 19/70 |
| 2018/0109812 A1* | 4/2018 | Tsai | H04N 19/157 |
| 2018/0184083 A1* | 6/2018 | Panusopone | H04N 19/107 |
| 2018/0199072 A1* | 7/2018 | Li | H04N 19/186 |
| 2018/0241998 A1* | 8/2018 | Chen | H04N 19/109 |
| 2020/0036985 A1 | 1/2020 | Jang et al. | |

FOREIGN PATENT DOCUMENTS

| | | |
|---|---|---|
| JP | 2021-523590 A | 9/2021 |
| KR | 10-2012-0035126 A | 4/2012 |
| KR | 10-2017-0094534 A | 8/2017 |
| KR | 10-2018-0039323 A | 4/2018 |
| TW | 201801531 A | 1/2018 |
| WO | 2018/062921 A1 | 4/2018 |
| WO | 2019009502 A1 | 1/2019 |
| WO | 2019/203940 A1 | 10/2019 |

OTHER PUBLICATIONS

Communication dated May 23, 2024, issued by the China National Intellectual Property Administration in Chinese Application No. 201980040716.5.
Communication dated May 29, 2024, issued by the INDIA Intellectual Property Office in Indian Application No. 202328000165.
Communication issued on Jan. 25, 2024 by the European Patent Office for European Patent Application No. 19800814.6.
Communication issued on Mar. 1, 2024 by the European Patent Office for European Patent Application No. 23218024.0.
Communication dated Apr. 13, 2022 issued by the State Intellectual Property Office of the P.R.China in application No. 201980040716.5.
Communication dated Jul. 20, 2021 issued by the Japanese Intellectual Property Office in counterpart Japanese Application No. 2020-563463.
Communication dated Jul. 22, 2021 issued by the State Intellectual Property Office of P.R. China in counterpart Chinese Application No. 201980040716.5.
Communication dated Mar. 6, 2023, issued by the European Patent Office in counterpart European Application No. 19800814.6.
Communication dated Sep. 12, 2023 issued by the European Patent Office in counterpart European Application No. 19800814.6.
Communication issued Jan. 19, 2022 by the European Patent Office in counterpart European Patent Application No. 19800814.6.
Communication issued Jan. 27, 2021 by the Korean Intellectual Property Office in corresponding Korean Application No. 10-2020-7021448.
Communication issued Oct. 31, 2022 by the Chinese Patent Office for Chinese Patent Application No. 201980040716.5.
Communication issued Sep. 7, 2022 by the European Patent Office in counterpart European Patent Application No. 19800814.6.
Communication issued Sep. 8, 2022 by the Indian Patent Office for Indian Patent Application No. 202027050126.
Jackie Ma et al. "Description of Core Experiment: Partitioning" Joint Video Exploration Team (JVET) of ITU-T SG 16 WP 3 and ISO/IEC JTC 1/SC 29/WG 11, 10th Meeting: San Diego, US, Apr. 10-20, 2018, Document: JVET-J1021-r5 (34 pages total).
Kiran Misra et al., "Description of SDR and HDR video coding technology proposal by Sharp and Foxconn", Joint Video Exploration Team (JVET) of ITU-T SG 16 WP 3 and ISO/IEC JTC 1/SC 29/WG 11, Document: JVET-J0026, Apr. 2018, 69 pages total.
Tadamasa Toma et al. "Description of SDR video coding technology proposal by Panasonic" Joint Video Experts Team (JVET) of ITU-T SG 16 WP 3 and ISO/IEC JTC 1/SC 29/WG 11, 10th Meeting: San Diego, US, Apr. 10-20, 2018, Document: JVET-J0020-v1, (76 pages total).
Tzu-Der Chuang et al., "CE1-related: Separate tree partitioning at 64×64-luma/32×32-chroma unit level", Joint Video Experts Team (JVET) of ITU-T SG 16 WP 3 and ISO/IEC JTC 1/SC 29/WG 11, Document: JVET-K0230-v3, Jul. 2018, 12 pages total.
Benjamin Bross et al., "Versatile Video Coding (Draft 5)", Joint Video Experts Team (JVET) of ITU-T SG 16 WP 3 and ISO/IEC JTC 1/SC 29/WG 11, Document: JVET-N1001-v3, Mar. 2019, 21 pages total.
Bross, Benjamin et al., "Versatile Video Coding (Draft 2)", Joint Video Experts Team (JVET) of ITU-T SG 16 WP 3 and ISO/IEC JTC 1/SC 29/WG 11, 11th Meeting: Ljubljana, SI, Jul. 10-18, 2018, Document: JVET-K 1001-v1. (41 pages total).
International Search Report and Written Opinion (PCT/ISA/210 and PCT/ISA/237), issued Aug. 23, 2019 by International Searching Authority in International Application No. PCT/KR2019/005662.
Office Action dated Jul. 4, 2023 issued by the Japanese Patent Office in counterpart Japanese Application No. 2022-76230.

(56) References Cited

OTHER PUBLICATIONS

Communication issued Jul. 22, 2024 by the Intellectual Property Office of India in Indian Patent Application No. 202328000068.
Communication issued Jul. 22, 2024 by the Intellectual Property Office of India in Indian Patent Application No. 202328000074.
Communication issued Oct. 22, 2024 by the Intellectual Property Office of India in Indian Patent Application No. 202328000064.

* cited by examiner

FIG. 13

| BLOCK SHAPE / DEPTH | 0: SQUARE | 1: NS_VER | 2: NS_HOR |
|---|---|---|---|
| DEPTH D | 1300 | 1310 | 1320 |
| DEPTH D+1 | 1302 | 1312 | 1322 |
| DEPTH D+2 | 1304 | 1314 | 1324 |
| ... | ... | ... | ... |

FIG. 18

| SQUARE BLOCK | |
|---|---|
| (00)b | □ |
| (01)b | ⊞ |
| (10)b | ⊟ |
| (11)b | ⊟ |

| NON-SQUARE BLOCK | | |
|---|---|---|
| (0)b | ▭ | ▯ |
| (10)b | ▭▭ | ▯▯ |
| (11)b | ▭▭▭ | ▯▯▯ |

FIG. 19

| SQUARE BLOCK | |
|---|---|
| (00)b | □ |
| (10)b | ▭ |
| (11)b | ◫ |

| NON-SQUARE BLOCK | | |
|---|---|---|
| (0)b | ▭ | ▯ |
| (10)b | ⊟ | ▯ |
| (11)b | ⊟ | ⊟ |

IMAGE SEGMENTATION METHOD AND APPARATUS FOR IMAGE ENCODING AND DECODING

CROSS REFERENCE TO RELATED APPLICATIONS

This is a continuation of U.S. application Ser. No. 18/101,953 filed Jan. 26, 2023, which is a continuation of U.S. application Ser. No. 17/492,250 filed Oct. 1, 2021 which is a continuation of U.S. application Ser. No. 17/052,573, filed on Nov. 3, 2020, in the United States Patent and Trademark Office, which is a National Stage Entry of International Application No. PCT/KR2019/005662, filed on May 10, 2019, which claims priority under 35 U.S.C. § 119 to U.S. Provisional Application No. 62/669,626, filed on May 10, 2018, in the United States Patent and Trademark Office, the disclosures of which are incorporated herein by reference in their entireties.

TECHNICAL FIELD

The disclosure relates to the field of image encoding and decoding. More particularly, the disclosure relates an image splitting method and apparatus for efficiently encoding and decoding an image.

BACKGROUND ART

As hardware capable of reproducing and storing a high-resolution and high-quality image has been developed, there is an increasing demand for a codec capable of efficiently encoding and decoding the high-resolution and high-quality image.

Recently, methods of effectively encoding the high-resolution and high-quality image content are proposed. For example, methods of encoding an image after randomly processing the image to be encoded are proposed.

Various data units may be used to encode an image, and an inclusion relation may exist between the data units. A data unit may be split by using various methods to determine a size of the data unit to be used in image encoding, and then an optimal data unit may be determined based on a characteristic of an image, such that the image may be encoded and decoded.

DESCRIPTION OF EMBODIMENTS

Technical Problem

The technical problem of an image splitting method and apparatus according to an embodiment is to encode and decode an image with a low bitrate by efficiently splitting the image.

Solution to Problem

According to an embodiment, an image decoding method includes: determining a first coding block of a first color component and a second coding block of a second color component corresponding to the first coding block, the first coding block and the second coding block being split from an image; when a size of the first coding block is equal to or smaller than a predetermined size, obtaining, from a bitstream, first split shape mode information about the first coding block and second split shape mode information about the second coding block; determining a split mode of the first coding block, based on the first split shape mode information, and determining a split mode of the second coding block, based on the second split shape mode information; and decoding, based on information obtained from the bitstream, a coding block of the first color component which is determined based on the split mode of the first coding block and a coding block of the second color component which is determined based on the split mode of the second coding block.

Advantageous Effects of Disclosure

An image splitting method and apparatus according to an embodiment may encode and decode an image with low bitrate by efficiently splitting the image.

Effects that are obtainable by an image splitting method and apparatus according to an embodiment are not limited to the aforementioned effects, and other unstated effects will be clearly understood by one of ordinary skill in the art in view of descriptions below.

BRIEF DESCRIPTION OF DRAWINGS

Descriptions about respective drawings are provided to gain a sufficient understanding of the drawings of the present specification.

FIG. 13 illustrates a process of determining a depth of a coding unit as a shape and size of the coding unit change, when the coding unit is recursively split such that a plurality of coding units are determined, according to an embodiment.

FIG. 18 illustrates various shapes of a coding unit that may be determined based on split shape mode information that is representable as a binary code.

FIG. 19 illustrates other shapes of the coding unit which may be determined based on split shape mode information representable by a binary code, according to an embodiment.

BEST MODE

Figure 1:
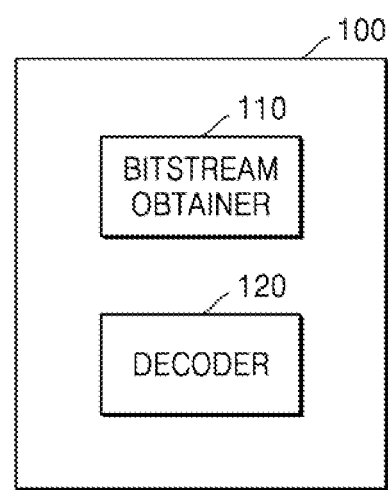
FIG. 1 is a block diagram of an image decoding apparatus, according to an embodiment.

According to an embodiment of the disclosure, an image decoding method includes: determining a first coding block of a first color component and a second coding block of a second color component corresponding to the first coding block, the first coding block and the second coding block being split from an image; when a size of the first coding block is equal to or smaller than a predetermined size, obtaining, from a bitstream, first split shape mode information about the first coding block and second split shape mode information about the second coding block; determining a split mode of the first coding block, based on the first split shape mode information, and determining a split mode of the second coding block, based on the second split shape mode information; and decoding, based on information obtained from the bitstream, a coding block of the first color component which is determined based on the split mode of the first coding block and a coding block of the second color component which is determined based on the split mode of the second coding block.

In an embodiment, the image decoding method may further include: when the size of the first coding block is greater than the predetermined size, determining the split modes of the first coding block and the second coding block to be a predetermined split mode; and decoding, based on the information obtained from the bitstream, the coding block of the first color component determined from the first coding block and the coding block of the second color component determined from the second coding block, according to the predetermined split mode.

The image decoding method may further include, when a size of the coding block of the first color component determined from the first coding block according to the predetermined split mode is equal to or smaller than the predetermined size, independently determining split modes of the coding block of the first color component and the coding block of the second color component corresponding to the coding block of the first color component, based on the first split shape mode information and the second split shape mode information obtained from the bitstream.

The second coding block may be recursively split, and when a size of a child coding block of the coding block of the second color component determined by recursively splitting the second coding block is equal to or smaller than a minimum size, splitting of the coding block of the second color component may not be allowed.

An allowable maximum depth of the first coding block may be greater than an allowable maximum depth of the second coding block.

The image decoding method may further include determining a split mode of the coding block of the first color component determined from the first coding block, in consideration of the split mode of the first coding block.

The image decoding method may further include determining an allowable split mode for the coding block of the first color component, based on at least one of a block shape of the coding block of the first color component determined from the first coding block and a block shape of a child coding block determinable from the coding block of the first color component, and wherein information necessary for identifying the allowable split mode and a split mode that is not allowed for the coding block of the first color component is not parsed from the bitstream.

When the coding block of the first color component determined from the first coding block corresponds to a coding block at a preset location from among coding blocks that are ternary split from the first coding block, splitting of the coding block of the first color component may not be allowed.

The image decoding method may further include, when a width or height of a transform block corresponding to the coding block of the first color component does not correspond to $2^n$, inverse transforming a transform coefficient of a coding block whose width or height corresponds to $2^n$.

The image decoding method may further include, when a width or height of a transform block corresponding to the coding block of the first color component does not correspond to $2^n$, determining a prediction mode of the coding block of the first color component as a prediction mode that does not require inverse transformation.

The image decoding method may further include, when a width or height of a transform block corresponding to the coding block of the first color component does not correspond to $2^n$, determining transform coefficients of the transform block to be 0, or determining the transform coefficients of the transform block to be a DC value obtained from the bitstream.

When a width or height of the coding block of the first color component does not correspond to $2^n$, the coding block of the first color component may be split into one or more coding blocks whose width and height correspond to $2^n$.

According to an embodiment of the disclosure, an image decoding apparatus includes: a bitstream obtainer configured to obtain a bitstream including a result of encoding an image; and a decoder configured to determine a first coding block of a first color component and a second coding block of a second color component corresponding to the first coding block, the first coding block and the second coding block being split from the image, when a size of the first coding block is equal to or smaller than a preset size, obtain, from a bitstream, first split shape mode information about the first coding block and second split shape mode information about the second coding block, determine a split mode of the first coding block, based on the first split shape mode information, and determining a split mode of the second coding block, based on the second split shape mode information, and decode, based on information obtained from the bitstream, a coding block of the first color component which is determined based on the split mode of the first coding block and a coding block of the second color component which is determined based on the split mode of the second coding block.

According to an embodiment of the disclosure, an image encoding method includes: determining a first coding block of a first color component and a second coding block of a second color component corresponding to the first coding block, the first coding block and the second coding block being split from an image; when a size of the first coding block is equal to or smaller than a preset size, determining a first split mode about the first coding block and a second split mode about the second coding block; encoding a coding block of the first color component which is determined based on the first split mode of the first coding block and a coding block of the second color component which is determined based on the second split mode of the second coding block; and generating a bitstream including first split shape mode information indicating the first split mode and second split shape mode information indicating the second split mode.

MODE OF DISCLOSURE

As the disclosure allows for various changes and numerous embodiments, particular embodiments will be illustrated in the drawings and described in detail in the written descriptions. However, this is not intended to limit the disclosure to particular modes of practice, and it is to be appreciated that all changes, equivalents, and substitutes that do not depart from the spirit and technical scope of the disclosure are encompassed in the disclosure.

In the descriptions of embodiments, detailed explanations of the related art are omitted when it is deemed that they may unnecessarily obscure the essence of the disclosure. Also, numerals (e.g., "first", "second", and the like) in descriptions of the specification are used only to distinguish one element from another element.

Throughout the specification, it will also be understood that, when an element is referred to as being "connected to" or "coupled with" another element, it can be directly connected to or coupled with the other element, or it can be indirectly connected to or coupled with the other element by having an intervening element interposed therebetween.

Throughout the specification, regarding an element represented as a "unit" or a "module", two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another component.

Throughout the specification, an "image" may be a still image of a video or may be a moving image, that is, the video itself.

Throughout the specification, a "sample" denotes data assigned to a sampling position of an image, i.e., data to be processed. For example, pixel values of an image in a spatial domain and transform coefficients on a transform domain may be samples. A unit including at least one such sample may be defined as a block.

Hereinafter, with reference to FIGS. 1 to 24, an image encoding method and apparatus therefor and an image decoding method and apparatus therefor, based on coding units and transform units of a tree structure, according to an embodiment will be provided.

FIG. 1 is a block diagram of an image decoding apparatus 100, according to an embodiment.

The image decoding apparatus 100 may include a bitstream obtainer 110 and a decoder 120.

The bitstream obtainer 110 and the decoder 120 may include at least one processor. Also, the bitstream obtainer 110 and the decoder 120 may include a memory storing instructions to be performed by the at least one processor.

The bitstream obtainer 110 may receive a bitstream. The bitstream includes information of an image encoded by an image encoding apparatus 200 to be described below. Also, the bitstream may be transmitted from the image encoding apparatus 200. The image encoding apparatus 200 and the image decoding apparatus 100 may be connected by wire or wirelessly, and the bitstream obtainer 110 may receive the bitstream via a wired or wireless network. The bitstream obtainer 110 may receive the bitstream from a storage medium such as an optical medium or a hard disk.

The decoder 120 may reconstruct an image, based on information obtained from the received bitstream. The decoder 120 may obtain, from the bitstream, a syntax element for reconstructing the image. The decoder 120 may reconstruct the image, based on the syntax element.

According to further descriptions about operations of the decoder 120, the decoder 120 may perform an operation of obtaining, from the bitstream, a bin string corresponding to a split shape mode of a coding unit. Then, the decoder 120 may perform an operation of determining a split rule of the coding unit. Also, the decoder 120 may perform an operation of splitting the coding unit into a plurality of coding units, based on at least one of the split rule and the bin string corresponding to the split shape mode.

Hereinafter, splitting of a coding unit will be described in detail according to an embodiment of the disclosure.

First, one image may be split into one or more slices or one or more tiles. One slice or one tile may be a sequence of one or more largest coding units (coding tree units (CTUs)). There is a largest coding block (coding tree block (CTB)) conceptually compared to a largest coding unit (CTU).

The largest coding unit (CTB) refers to an N×N block including N×N samples (where N is an integer). Each color component may be split into one or more largest coding blocks.

When an image has three sample arrays (sample arrays for Y, Cr, and Cb components, respectively), a largest coding unit (CTU) includes a largest coding block of a luma sample, two corresponding largest coding blocks of chroma samples, and syntax structures used to encode the luma sample and the chroma samples. When an image is a monochrome picture, a largest coding unit includes a largest coding block of a monochrome sample and syntax structures used to encode the monochrome samples.

One largest coding block (CTB) may be split into M×N coding blocks including M×N samples (where M and N are integers).

When an image has sample arrays for respective Y, Cr, and Cb components, a coding unit (CU) includes a coding block of a luma sample, two corresponding coding blocks of chroma samples, and syntax structures used to encode the luma sample and the chroma samples. When an image is a monochrome picture, a coding unit includes a coding block of a monochrome sample and syntax structures used to encode the monochrome samples.

As described above, a largest coding block and a largest coding unit are conceptually distinguished from each other, and a coding block and a coding unit are conceptually distinguished from each other. That is, a (largest) coding unit refers to a data structure including a (largest) coding block including a corresponding sample and a syntax structure corresponding to the (largest) coding block. However, because one of ordinary skill in the art can understand that a (largest) coding unit or a (largest) coding block refers to a block of a certain size including the certain number of samples, a largest coding block and a largest coding unit, or a coding block and a coding unit are mentioned in the following specification without being distinguished unless otherwise described.

An image may be split into largest coding units (CTUs). A size of each largest coding unit may be determined based on information obtained from a bitstream. A shape of each largest coding unit may be a square shape of the same size. However, the disclosure is not limited thereto.

For example, information about a maximum size of a luma coding block may be obtained from the bitstream. For example, the maximum size of the luma coding block indicated by the information about the maximum size of the luma coding block may be one of 4×4, 8×8, 16×16, 32×32, 64×64, 128×128, and 256×256.

For example, information about a maximum size of a luma coding block that is splittable by 2 and information about a luma block size difference may be obtained from the bitstream. The information about the luma block size difference may refer to a size difference between a largest luma coding block and a largest luma coding block that is splittable by 2. Accordingly, when the information about the maximum size of the luma coding block that is splittable by 2 and the information about the luma block size difference obtained from the bitstream are combined with each other, a size of the luma largest coding block may be determined. A size of a chroma largest coding block may be determined by using the size of the luma largest coding block. For example, when a Y:Cb:Cr ratio is 4:2:0 according to a color format, a size of a chroma block may be half a size of a luma block, and a size of a chroma largest coding block may be half a size of a luma largest coding block.

According to an embodiment, because information about a maximum size of a luma coding block that is binary splittable is obtained from the bitstream, the maximum size of the luma coding block that is binary splittable may be variably determined. In contrast, a maximum size of a luma coding block that is ternary splittable may be fixed. For example, the maximum size of the luma coding block that is ternary splittable in an I-image may be 32×32, and the maximum size of the luma coding block that is ternary splittable in a P-image or a B-image may be 64×64.

Also, a largest coding unit may be hierarchically split into coding units, based on split shape mode information obtained from the bitstream. At least one of information indicating whether multi-splitting is to be performed, information indicating whether quad splitting is to be performed, split direction information, and split type information may be obtained as the split shape mode information from the bitstream.

For example, the information indicating whether multi-splitting is to be performed may indicate whether a current coding unit is not to be further split (NO_SPLIT) or is to be split (SPLIT).

For example, when the current coding unit is to be split, the information indicating whether quad splitting is to be performed may indicate whether the current coding unit is to be quad split (QUAD_SPLIT) or is not to be quad split.

When the current coding unit is not to be quad split, the split direction information indicates that the current coding unit is to be split in one of a horizontal direction or a vertical direction.

When the current coding unit is to be split in the horizontal direction or the vertical direction, the split type information indicates that the current coding unit is to be binary split or ternary split.

A split mode of the current coding unit may be determined according to the split direction information and the split type information. A split mode when the current coding unit is binary split in the horizontal direction may be determined to be a binary horizontal split mode (SPLIT_BT_HOR), a split mode when the current coding unit is ternary split in the horizontal direction may be determined to be a ternary horizontal split mode (SPLIT_TT_HOR), a split mode when the current coding unit is binary split in the vertical direction may be determined to be a binary vertical split mode (SPLIT_BT_VER), and a split mode when the current coding unit is ternary split in the vertical direction may be determined to be a ternary vertical split mode SPLIT_TT_VER.

The decoder 120 may obtain, from the bitstream, the split shape mode information from one bin string. A form of the bitstream received by the bitstream obtainer 110 may include fixed length binary code, unary code, truncated unary code, predetermined binary code, or the like. The bin string is information in a binary number. The bin string may include at least one bit. The decoder 120 may obtain the split shape mode information corresponding to the bin string, based on the split rule. The decoder 120 may determine whether to quad-split a coding unit, whether not to split a coding unit, a split direction, and a split type, based on one bin string.

The coding unit may be smaller than or equal to the largest coding unit. For example, because a largest coding unit is a coding unit having a maximum size, the largest coding unit is one of coding units. When split shape mode information about a largest coding unit indicates that splitting is not to be performed, a coding unit determined in the largest coding unit has the same size as that of the largest coding unit. When split shape code information about a largest coding unit indicates that splitting is to be performed, the largest coding unit may be split into coding units. Also, when split shape mode information about a coding unit indicates that splitting is to be performed, the coding unit may be split into smaller coding units. However, the splitting of the image is not limited thereto, and the largest coding unit and the coding unit may not be distinguished. The splitting of the coding unit will be described in detail with reference to FIGS. 3 to 16.

Also, one or more prediction units for prediction may be determined from a coding unit. A size of the prediction unit may be equal to a size of the coding unit or may be smaller than the size of the coding unit. Also, one or more transform units for transformation may be determined from the coding unit. A size of the transform unit may be equal to the size of the coding unit or may be smaller than the size of the coding unit.

The shapes and sizes of the transform unit and the prediction unit may not be related to each other.

In an embodiment, prediction may be performed by using a coding unit as a prediction unit. Also, transformation may be performed by using a coding unit as a transform block.

A width or height of a transform unit determined from a coding unit according to various split shape modes may not correspond to $2^n$ (where n is an integer). In other words, the number of samples arrayed in a transverse direction or longitudinal direction of the transform unit may not correspond to $2^n$. When a width and height of a transform kernel for inverse-transforming a transform coefficient included in the transform unit correspond to $2'$, the transform kernel cannot be used in inverse-transformation with respect to the transform unit whose width or height does not correspond to $2^n$. In this case, a transform kernel whose width or height corresponds to $2^n$ is requested, and this increases the complexity of transformation and inverse-transformation. Accordingly, the disclosure proposes a solution for solving a problem in which correct frequency transformation or inverse-transformation is not performed because a width or a height of a transform unit does not correspond to $2^n$. The solution will be described below with reference to FIGS. 21 and 22.

Splitting of a coding unit will be described in detail with reference to FIGS. 3 to 16.

Figure 3:
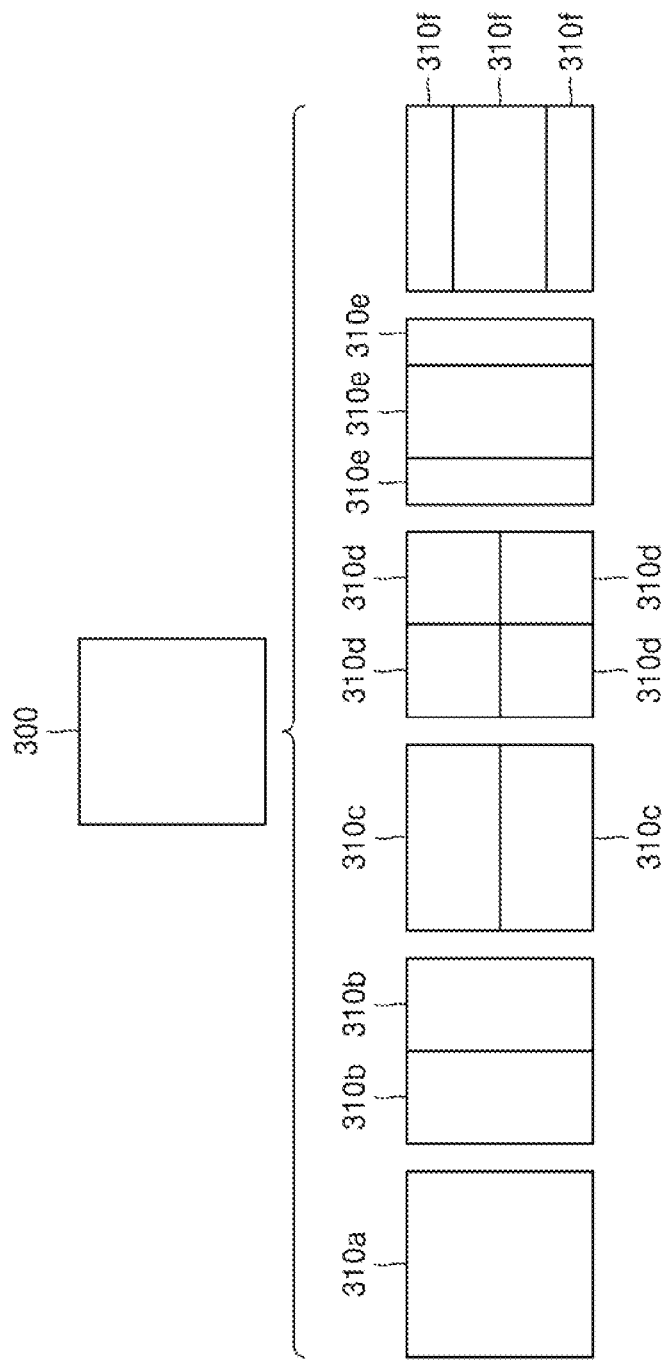
FIG. 3 illustrates a process, performed by the image decoding apparatus, of determining at least one coding unit by splitting a current coding unit, according to an embodiment.

FIG. 3 illustrates a process, performed by the decoder 120, of determining at least one coding unit by splitting a current coding unit, according to an embodiment.

A block shape may include 4N×4N, 4N×2N, 2N×4N, 4N×N, N×4N, 32N×N, N×32N, 16N×N, N×16N, 8N×N, or N×8N. Here, N may be a positive integer. Block shape information refers to information indicating at least one of a shape, a direction, a ratio of a width and height, or a size which is of a coding unit.

The shape of the coding unit may include a square and a non-square. When the width and height of the coding unit are equal (i.e., when the block shape of the coding unit is 4N×4N), the decoder 120 may determine the block shape information of the coding unit to be a square.

When the width and the height of the coding unit are different from each other (i.e., when the block shape of the coding unit is 4N×2N, 2N×4N, 4N×N, N×4N, 32N×N, N×32N, 16N×N, N×16N, 8N×N, or N×8N), the decoder 120 may determine the block shape information of the coding unit to be a non-square shape. When the shape of the coding unit is non-square, the decoder 120 may determine the ratio of the width and height in the block shape information of the coding unit to be at least one of 1:2, 2:1, 1:4, 4:1, 1:8, 8:1, 1:16, 16:1, 1:32, and 32:1. Also, the decoder 120 may determine whether the coding unit is in a horizontal direction or a vertical direction, based on the length of the width and the length of the height of the coding unit. Also, the decoder 120 may determine the size of the coding unit, based on at least one of the length of the width, the length of the height, or the area of the coding unit.

According to an embodiment, the decoder 120 may determine the shape of the coding unit by using the block shape information, and may determine a splitting method of the coding unit by using the split shape mode information. That is, a coding unit splitting method indicated by the split shape mode information may be determined based on a block shape indicated by the block shape information used by the decoder 120.

The decoder 120 may obtain the split shape mode information from a bitstream. However, an embodiment is not limited thereto, and the decoder 120 and an encoder 220 of the image encoding apparatus 200 may determine pre-agreed split shape mode information, based on the block shape information. The decoder 120 may determine the pre-agreed split shape mode information with respect to a largest coding unit or a smallest coding unit. For example, the decoder 120 may determine split shape mode information with respect to the largest coding unit to be a quad split. Also, the decoder 120 may determine split shape mode information regarding the smallest coding unit to be "not to perform splitting". In particular, the decoder 120 may determine the size of the largest coding unit to be 256×256. The image decoding apparatus 100 may determine the pre-agreed split shape mode information to be a quad split. The quad split is a split shape mode in which both the width and the height of the coding unit are bisected. The decoder 120 may obtain a coding unit of a 128×128 size from the largest coding unit of a 256×256 size, based on the split shape mode information. Also, the decoder 120 may determine the size of the smallest coding unit to be 4×4. The decoder 120 may obtain split shape mode information indicating "not to perform splitting" with respect to the smallest coding unit.

Also, the decoder 120 may determine split shape mode information of a child coding unit, based on split shape mode information of a parent coding unit. The child coding unit refers to a coding unit split from the parent coding unit. For example, when the split shape mode information of the parent coding unit indicates binary vertical split, a split shape of the child coding unit may correspond to a split shape other than the binary vertical split.

Also, the decoder 120 may determine a split shape of the parent coding unit, in consideration of block shapes of child coding units to be generated by splitting the parent coding unit. For example, when sizes of the child coding units to be generated by ternary vertically splitting the parent coding unit are smaller than a predetermined size, the deco der 120 may determine the split shape of the parent coding unit to be a split shape other than ternary vertical split.

According to an embodiment, the decoder 120 may use the block shape information indicating that the current coding unit has a square shape. For example, the decoder 120 may determine whether not to split a square coding unit, whether to vertically split the square coding unit, whether to horizontally split the square coding unit, or whether to split the square coding unit into four coding units, based on the split shape mode information.

Referring to FIG. 3, when the block shape information of a current coding unit 300 indicates a square shape, the decoder 120 may determine a coding unit 310a that is not split from the current coding unit 300, based on the split shape mode information indicating not to perform splitting, or may determine coding units 310b, 310c, 310d, 310e, or 310f split from the current coding unit 300, based on the split shape mode information indicating a predetermined splitting method.

Referring to FIG. 3, according to an embodiment, the decoder 120 may determine two coding units 310b obtained by splitting the current coding unit 300 in a vertical direction, based on the split shape mode information indicating to perform binary splitting in a vertical direction. The decoder 120 may determine two coding units 310c obtained by splitting the current coding unit 300 in a horizontal direction, based on the split shape mode information indicating to perform binary splitting in a horizontal direction. The decoder 120 may determine four coding units 310d obtained by splitting the current coding unit 300 in vertical and horizontal directions, based on the split shape mode information indicating to perform splitting in vertical and horizontal directions. According to an embodiment, the decoder 120 may determine three coding units 310e obtained by splitting the current coding unit 300 in a vertical direction, based on the split shape mode information indicating to perform ternary splitting in a vertical direction. The decoder 120 may determine three coding units 310f obtained by splitting the current coding unit 300 in a horizontal direction, based on the split shape mode information indicating to perform ternary splitting in a horizontal direction. However, splitting methods of the square coding unit are not limited to the aforementioned methods, and may include various methods that may be indicated by the split shape mode information. Split shapes of the square coding unit will be described in detail below in relation to various embodiments.

Figure 4:
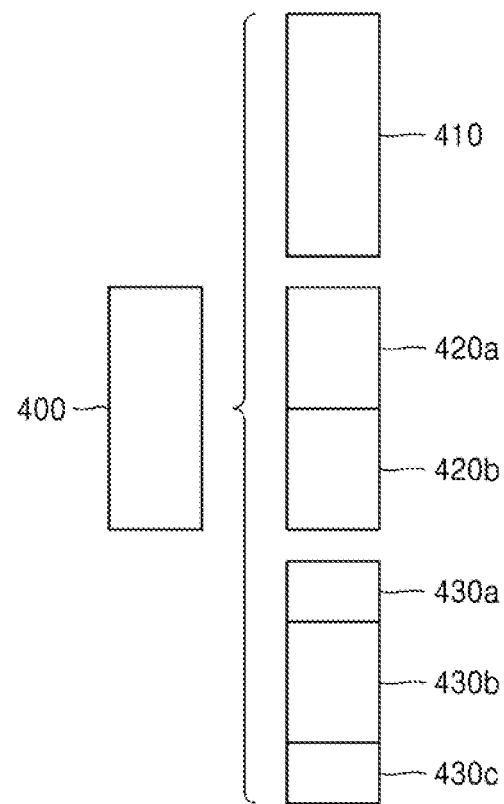
FIG. 4 illustrates a process, performed by the image decoding apparatus, of determining at least one coding unit by splitting a non-square coding unit, according to an embodiment.
Figure 4:
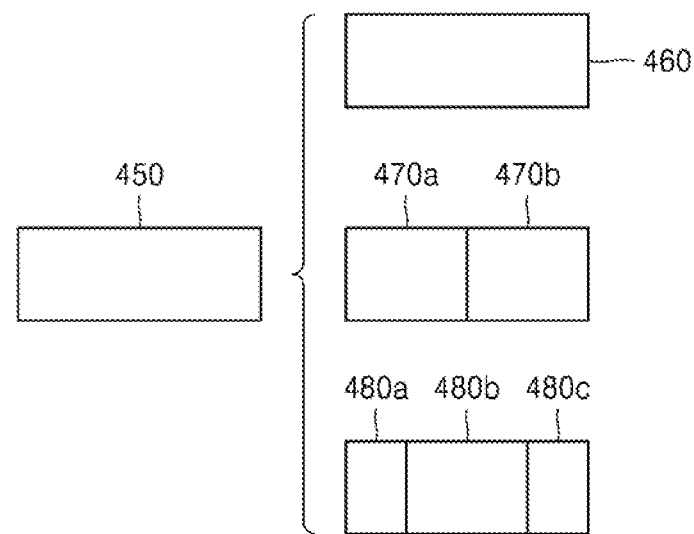

FIG. 4 illustrates a process, performed by the decoder 120, of determining at least one coding unit by splitting a non-square coding unit, according to an embodiment.

According to an embodiment, the decoder 120 may use block shape information indicating that a current coding unit has a non-square shape. The decoder 120 may determine whether not to split the non-square current coding unit or whether to split the non-square current coding unit by using a predetermined splitting method, based on split shape mode information. Referring to FIG. 4, when the block shape information of a current coding unit 400 or 450 indicates a non-square shape, the decoder 120 may determine that a coding unit 410 or 460 having the same size as the current coding unit 400 or 450, based on the split shape mode information indicating not to perform splitting, or may determine coding units 420a and 420b, 430a, 430b, and 430c, 470a and 470b, or 480a, 480b, and 480c which are split based on the split shape mode information indicating a predetermined splitting method. Predetermined splitting methods of splitting a non-square coding unit will be described in detail below in relation to various embodiments.

According to an embodiment, the decoder 120 may determine a splitting method of a coding unit by using the split shape mode information and, in this case, the split shape mode information may indicate the number of one or more coding units generated by splitting a coding unit. Referring to FIG. 4, when the split shape mode information indicates to split the current coding unit 400 or 450 into two coding units, the decoder 120 may determine two coding units 420a and 420b, or 470a and 470b included in the current coding unit 400 or 450, by splitting the current coding unit 400 or 450 based on the split shape mode information.

According to an embodiment, when the decoder 120 splits the non-square current coding unit 400 or 450 based on the split shape mode information, the decoder 120 may split a current coding unit, in consideration of the location of a long side of the non-square current coding unit 400 or 450. For example, the decoder 120 may determine a plurality of coding units by splitting the current coding unit 400 or 450 by splitting a long side of the current coding unit 400 or 450, in consideration of the shape of the current coding unit 400 or 450.

According to an embodiment, when the split shape mode information indicates to split (ternary-split) a coding unit into an odd number of blocks, the decoder 120 may determine an odd number of coding units included in the current coding unit 400 or 450. For example, when the split shape mode information indicates to split the current coding unit 400 or 450 into three coding units, the decoder 120 may split the current coding unit 400 or 450 into three coding units 430a, 430b, and 430c, or 480a, 480b, and 480c.

According to an embodiment, a ratio of the width and height of the current coding unit 400 or 450 may be 4:1 or 1:4. When the ratio of the width and height is 4:1, the block shape information may indicate a horizontal direction because the length of the width is longer than the length of the height. When the ratio of the width and height is 1:4, the block shape information may indicate a vertical direction because the length of the width is shorter than the length of the height. The decoder 120 may determine to split a current coding unit into the odd number of blocks, based on the split shape mode information. Also, the decoder 120 may determine a split direction of the current coding unit 400 or 450, based on the block shape information of the current coding unit 400 or 450. For example, when the current coding unit 400 is in the vertical direction, the decoder 120 may determine the coding units 430a, 430b, and 430c by splitting the current coding unit 400 in the horizontal direction. Also, when the current coding unit 450 is in the horizontal direction, the decoder 120 may determine the coding units 480a, 480b, and 480c by splitting the current coding unit 450 in the vertical direction.

According to an embodiment, the decoder 120 may determine the odd number of coding units included in the current coding unit 400 or 450, and not all the determined coding units may have the same size. For example, a predetermined coding unit 430b or 480b from among the determined odd number of coding units 430a, 430b, and 430c, or 480a, 480b, and 480c may have a size different from the size of the other coding units 430a and 430c, or 480a and 480c. That is, coding units which may be determined by splitting the current coding unit 400 or 450 may have multiple sizes and, in some cases, all of the odd number of coding units 430a, 430b, and 430c, or 480a, 480b, and 480c may have different sizes.

According to an embodiment, when the split shape mode information indicates to split a coding unit into the odd number of blocks, the decoder 120 may determine the odd number of coding units included in the current coding unit 400 or 450, and in addition, may put a predetermined restriction on at least one coding unit from among the odd number of coding units generated by splitting the current coding unit 400 or 450. Referring to FIG. 4, the decoder 120 may allow a decoding process of the coding unit 430b or 480b to be different from that of the other coding units 430a and 430c, or 480a or 480c, wherein the coding unit 430b or 480b is at a center location from among the three coding units 430a, 430b, and 430c or 480a, 480b, and 480c generated by splitting the current coding unit 400 or 450. For example, the decoder 120 may restrict the coding unit 430b or 480b at the center location to be no longer split or to be split only a predetermined number of times, unlike the other coding units 430a and 430c, or 480a and 480c.

Figure 5:
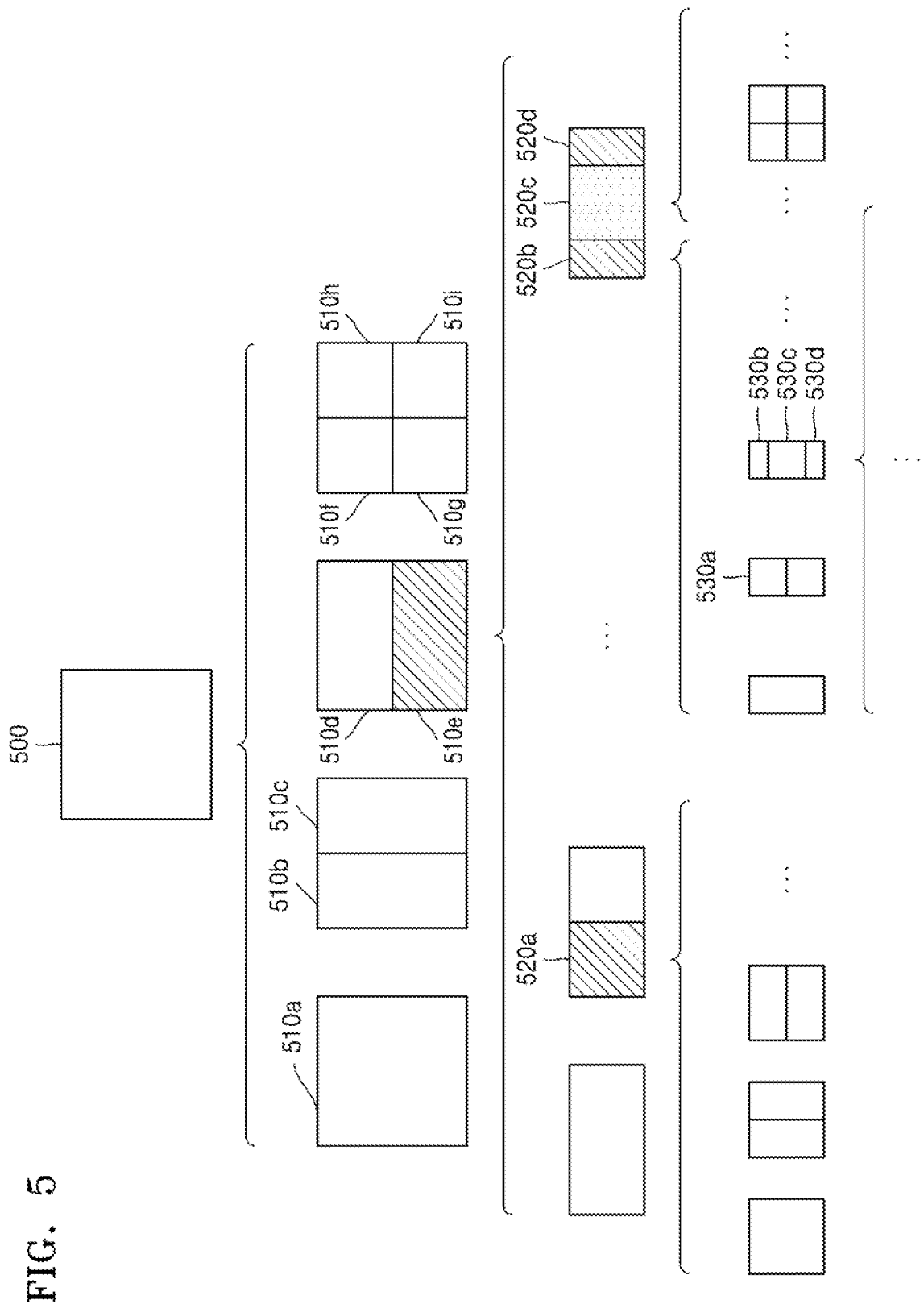
FIG. 5 illustrates a process, performed by the image decoding apparatus, of splitting a coding unit based on at least one of block shape information and split shape mode information, according to an embodiment.

FIG. 5 illustrates a process, performed by the decoder 120, of splitting a coding unit based on at least one of block shape information and split shape mode information, according to an embodiment.

According to an embodiment, the decoder 120 may determine to split a square first coding unit 500 into coding units, based on at least one of the block shape information and the split shape mode information, or may determine to not split the square first coding unit 500. According to an embodiment, when the split shape mode information indicates to split the first coding unit 500 in a horizontal direction, the decoder 120 may determine second coding units 510d and 510e by splitting the first coding unit 500 in a horizontal direction. A first coding unit, a second coding unit, and a third coding unit used according to an embodiment are terms used to understand a relation before and after splitting a coding unit. For example, the second coding unit may be determined by splitting the first coding unit, and the third coding unit may be determined by splitting the second coding unit. It will be understood that the structure of the first coding unit, the second coding unit, and the third coding unit follows the above descriptions.

According to an embodiment, the decoder 120 may determine to split or not to split the second coding unit 510e into third coding units, based on the split shape mode information. Referring to FIG. 5, the decoder 120 may split the non-square second coding unit 510e, which is determined by splitting the first coding unit 500, into one or more third coding units 520a, or 520b, 520c, and 520d based on the split shape mode information, or may not split the non-square second coding unit 510e.

The decoder 120 may obtain the split shape mode information, and may determine a plurality of various-shaped second coding units 510b, 510c, 510d, 510e, 510f, 510g, 510h, and 510i by splitting the first coding unit 500, based on the obtained split shape mode information, and the second coding units 510b, 510c, 510d, 510e, 510f, 510g, 510h, and 510i may be split by using a splitting method of the first coding unit 500, based on the split shape mode information. According to an embodiment, when the first coding unit 500 is split into the second coding units 510b, 510c, 510d, 510e, 510f, 510g, 510h, and 510i, based on the split shape mode information of the first coding unit 500, the second coding units 510b, 510c, 510d, 510e, 510f, 510g, 510h, and 510i may also be split into third coding units, based on the split shape mode information of the second coding units 510b, 510c, 510d, 510e, 510f, 510g, 510h, and 510i. That is, a coding unit may be recursively split based on the split shape mode information of each coding unit. Therefore, a square coding unit may be determined by splitting a non-square coding unit, and a non-square coding unit may be determined by recursively splitting the square coding unit. According to an embodiment, when the first coding unit 500 is split into the second coding units 510b, 510c, 510d, 510e, 510f, 510g, 510h, and 510i, based on the split shape mode information of the first coding unit 500, split shapes of the second coding units 510b, 510c, 510d, 510e, 510f, 510g, 510h, and 510i may correspond to split shapes other than a split shape of the first coding unit 500. For example, when the split shape mode information of the first coding unit 500 indicates quad split, a split shape of the second coding units 510f, 510g, 510h, and 510i may correspond to a split shape other than quad split. In this case, when the decoder 120 determines a split shape mode of the second coding units 510f, 510g, 510h, and 510i, the decoder 120 may not parse, from a bitstream, information indicating whether to perform quad splitting. Also, when the split shape mode information of the first coding unit 500 indicates binary vertical split, a split shape of the second coding units 510b and 510c may correspond to a split shape other than binary vertical split. In this case, when the decoder 120 determines the split shape of the second coding units 510b and 510c, the decoder 120 may not parse, from the bitstream, split direction information indicating a vertical direction and split type information indicating binary split.

Referring to FIG. 5, a predetermined coding unit (e.g., a coding unit located at a center location or a square coding unit) from among the odd number of third coding units 520b, 520c, and 520d determined by splitting the non-square second coding unit 510e may be recursively split. According to an embodiment, the non-square third coding unit 520c from among the odd number of third coding units 520b, 520c, and 520d may be split in a horizontal direction into a plurality of fourth coding units. A non-square fourth coding unit 530b or 530d from among a plurality of fourth coding units 530a, 530b, 530c, and 530d may be re-split into a plurality of coding units. For example, the non-square fourth coding unit 530b or 530d may be re-split into the odd number of coding units. A method that may be used to recursively split a coding unit will be described below in relation to various embodiments.

According to an embodiment, the decoder 120 may split each of the third coding units 520a, or 520b, 520c, and 520d into fourth coding units, based on the split shape mode information. Also, the decoder 120 may determine to not split the second coding units 510b, 510c, 510d, 510e, 510f, 510g, 510h, and 510i, based on the split shape mode information. According to an embodiment, the decoder 120 may split the non-square second coding unit 510e into the odd number of third coding units 520b, 520c, and 520d. The decoder 120 may put a predetermined restriction on a predetermined third coding unit from among the odd number of third coding units 520b, 520c, and 520d. For example, the decoder 120 may restrict the third coding unit 520c at a center location from among the odd number of third coding units 520b, 520c, and 520d to be no longer split or to be split a settable number of times.

Referring to FIG. 5, the decoder 120 may restrict the third coding unit 520c, which is located at the center location from among the odd number of third coding units 520b, 520c, and 520d included in the non-square second coding unit 510e, to be no longer split, to be split to have a predetermined split shape (e.g., split into four coding units, split to a same split shape as a split shape of the second coding unit 510e, split to a split shape other than the split shape of the second coding unit 510e, or split in a split direction other than a split direction of the second coding unit 510e), or to be split only a predetermined number of times (e.g., split only n times (where n>0)). In the disclosure, when a split shape of a coding unit is restricted to a predetermined split shape (e.g., no split, quad split, binary horizontal split, binary vertical split, ternary horizontal split, or ternary vertical split), this may indicate that the coding unit is splittable only to the predetermined split shape. Also, that the number of times of splitting of a coding unit is restricted to a predetermined number of times of splitting may indicate that the coding unit is splittable by only the predetermined number of times of splitting.

When splitting of the third coding unit 520c at the center location from among the odd number of third coding units 520b, 520c, and 520d is not allowed, the decoder 120 may not parse, from the bitstream, split shape mode information of the third coding unit 520c at the center location. When splitting of the third coding unit 520c at the center location from among the odd number of third coding units 520*b*, 520*c*, and 520*d* is restricted to a predetermined split shape, the decoder 120 may not parse, from the bitstream, information necessary to determine the predetermined split shape. For example, when a split shape of the third coding unit 520*c* is restricted to horizontal split, the decoder 120 may not parse, from the bitstream, split direction information indicating a horizontal direction or a vertical direction. When the split shape of the third coding unit 520*c* is restricted to binary split, the decoder 120 may not parse, from the bitstream, split type information indicating binary split or ternary split. However, the restrictions on the coding unit 520*c* at the center location are not limited to the aforementioned examples, and it should be interpreted that the restrictions may include various restrictions for decoding the coding unit 520*c* at the center location differently from the other third coding units 520*b* and 520*d*.

According to an embodiment, the decoder 120 may obtain the split shape mode information, which is used to split a current coding unit, from a predetermined location in the current coding unit.

Figure 6:
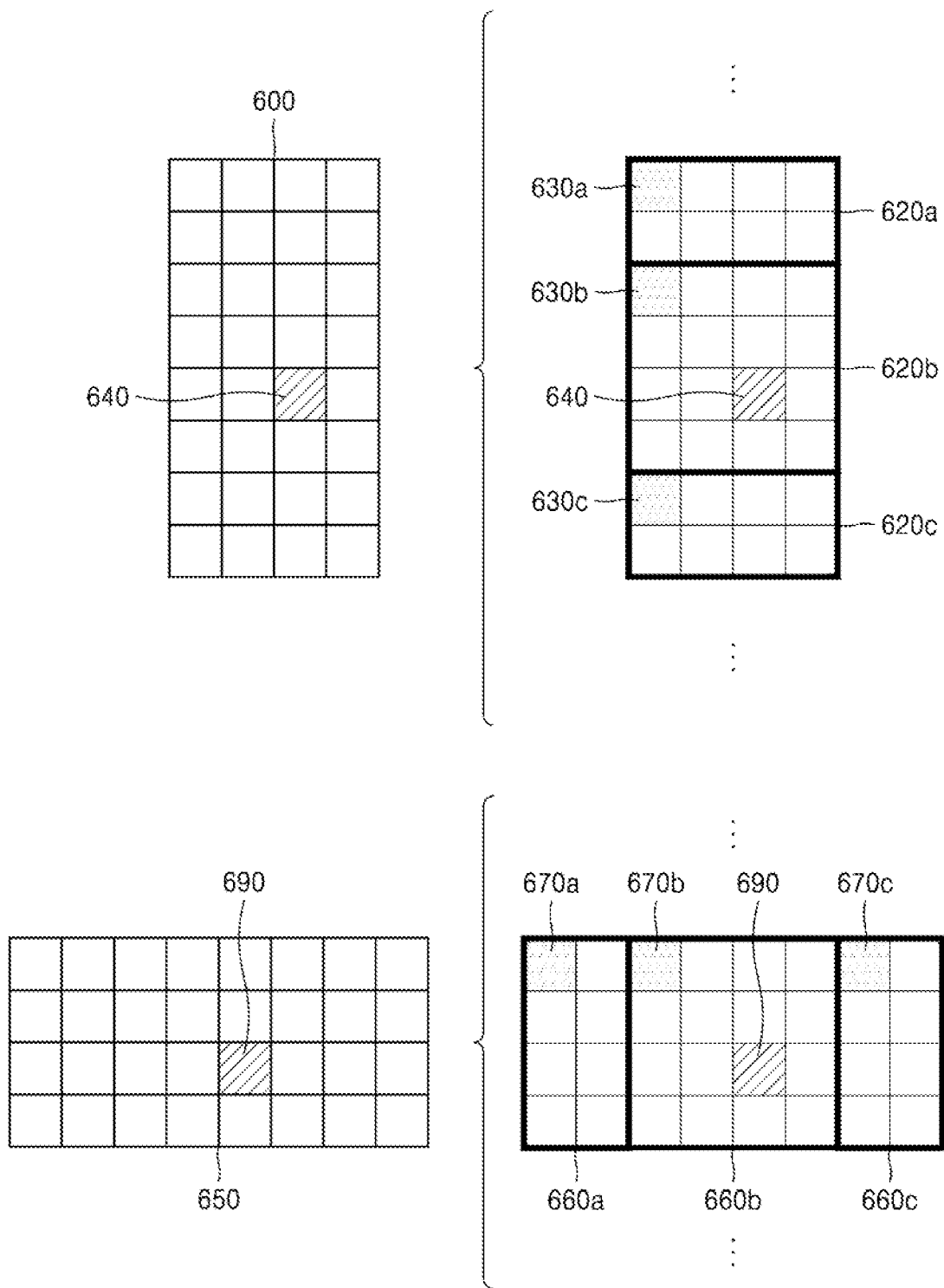
FIG. 6 illustrates a method, performed by the image decoding apparatus, of determining a predetermined coding unit from among an odd number of coding units, according to an embodiment.

FIG. 6 illustrates a method, performed by the decoder 120, of determining a predetermined coding unit from among an odd number of coding units, according to an embodiment.

Referring to FIG. 6, split shape mode information of a current coding unit 600 or 650 may be obtained from a sample of a predetermined location (e.g., a sample 640 or 690 of a center location) from among a plurality of samples included in the current coding unit 600 or 650. However, the predetermined location in the current coding unit 600, from which at least one piece of the split shape mode information may be obtained, is not limited to the center location in FIG. 6, and may include various locations included in the current coding unit 600 (e.g., top, bottom, left, right, upper-left, lower-left, upper-right, and lower-right locations). The decoder 120 may obtain the split shape mode information from the predetermined location and may determine to split or not to split the current coding unit into various-shaped and various-sized coding units.

According to an embodiment, when the current coding unit is split into a predetermined number of coding units, the decoder 120 may select one of the coding units. Various methods may be used to select one of a plurality of coding units, as will be described below in relation to various embodiments.

According to an embodiment, the decoder 120 may split the current coding unit into a plurality of coding units, and may determine a coding unit at a predetermined location.

According to an embodiment, the decoder 120 may use information indicating locations of the odd number of coding units, so as to determine a coding unit at a center location from among the odd number of coding units. Referring to FIG. 6, the decoder 120 may determine the odd number of coding units 620*a*, 620*b*, and 620*c* or the odd number of coding units 660*a*, 660*b*, and 660*c* by splitting the current coding unit 600 or the current coding unit 650. The decoder 120 may determine the middle coding unit 620*b* or the middle coding unit 660*b* by using information about the locations of the odd number of coding units 620*a*, 620*b*, and 620*c* or the odd number of coding units 660*a*, 660*b*, and 660*c*. For example, the decoder 120 may determine the coding unit 620*b* of the center location by determining the locations of the coding units 620*a*, 620*b*, and 620*c* based on information indicating locations of predetermined samples included in the coding units 620*a*, 620*b*, and 620*c*. In detail, the decoder 120 may determine the coding unit 620*b* at the center location by determining the locations of the coding units 620*a*, 620*b*, and 620*c* based on information indicating locations of top-left samples 630*a*, 630*b*, and 630*c* of the coding units 620*a*, 620*b*, and 620*c*.

According to an embodiment, the information indicating the locations of the top-left samples 630*a*, 630*b*, and 630*c*, which are included in the coding units 620*a*, 620*b*, and 620*c*, respectively, may include information about locations or coordinates of the coding units 620*a*, 620*b*, and 620*c* in an image. According to an embodiment, the information indicating the locations of the top-left samples 630*a*, 630*b*, and 630*c*, which are included in the coding units 620*a*, 620*b*, and 620*c*, respectively, may include information indicating widths or heights of the coding units 620*a*, 620*b*, and 620*c* included in the current coding unit 600, and the widths or heights may correspond to information indicating differences between the coordinates of the coding units 620*a*, 620*b*, and 620*c* in the image. That is, the decoder 120 may determine the coding unit 620*b* at the center location by directly using the information about the locations or coordinates of the coding units 620*a*, 620*b*, and 620*c* in the image, or by using the information about the widths or heights of the coding units, which correspond to the difference values between the coordinates.

According to an embodiment, information indicating the location of the top-left sample 630*a* of the upper coding unit 620*a* may include coordinates (xa, ya), information indicating the location of the top-left sample 630*b* of the middle coding unit 620*b* may include coordinates (xb, yb), and information indicating the location of the top-left sample 630*c* of the lower coding unit 620*c* may include coordinates (xc, yc). The decoder 120 may determine the middle coding unit 620*b* by using the coordinates of the top-left samples 630*a*, 630*b*, and 630*c* which are included in the coding units 620*a*, 620*b*, and 620*c*, respectively. For example, when the coordinates of the top-left samples 630*a*, 630*b*, and 630*c* are sorted in an ascending or descending order, the coding unit 620*b* including the coordinates (xb, yb) of the sample 630*b* at a center location may be determined to be a coding unit at a center location from among the coding units 620*a*, 620*b*, and 620*c* determined by splitting the current coding unit 600. However, the coordinates indicating the locations of the top-left samples 630*a*, 630*b*, and 630*c* may include coordinates indicating absolute locations in the image, or may use coordinates (dxb, dyb) indicating a relative location of the top-left sample 630*b* of the middle coding unit 620*b* and coordinates (dxc, dyc) indicating a relative location of the top-left sample 630*c* of the lower coding unit 620*c* with reference to the location of the top-left sample 630*a* of the upper coding unit 620*a*. A method of determining a coding unit at a predetermined location by using coordinates of a sample included in the coding unit, as information indicating a location of the sample, is not limited to the aforementioned method, and may include various arithmetic methods capable of using the coordinates of the sample.

According to an embodiment, the decoder 120 may split the current coding unit 600 into a plurality of coding units 620*a*, 620*b*, and 620*c*, and may select one of the coding units 620*a*, 620*b*, and 620*c* based on a predetermined criterion. For example, the decoder 120 may select the coding unit 620*b*, which has a size different from that of the others, from among the coding units 620*a*, 620*b*, and 620*c*.

According to an embodiment, the decoder 120 may determine the width or height of each of the coding units 620*a*, 620*b*, and 620*c* by using the coordinates (xa, ya) that is the information indicating the location of the top-left sample 630*a* of the upper coding unit 620*a*, the coordinates (xb, yb)

that is the information indicating the location of the top-left sample 630b of the middle coding unit 620b, and the coordinates (xc, yc) that is the information indicating the location of the top-left sample 630c of the lower coding unit 620c. The decoder 120 may determine the respective sizes of the coding units 620a, 620b, and 620c by using the coordinates (xa, ya), (xb, yb), and (xc, yc) indicating the locations of the coding units 620a, 620b, and 620c. According to an embodiment, the decoder 120 may determine the width of the upper coding unit 620a to be the width of the current coding unit 600. The decoder 120 may determine the height of the upper coding unit 620a to be yb-ya. According to an embodiment, the decoder 120 may determine the width of the middle coding unit 620b to be the width of the current coding unit 600. The decoder 120 may determine the height of the middle coding unit 620b to be yc-yb. According to an embodiment, the decoder 120 may determine the width or height of the lower coding unit 620c by using the width or height of the current coding unit 600 or the widths or heights of the upper and middle coding units 620a and 620b. The decoder 120 may determine a coding unit, which has a size different from that of the others, based on the determined widths and heights of the coding units 620a, 620b, and 620c. Referring to FIG. 6, the decoder 120 may determine the middle coding unit 620b, which has a size different from the size of the upper and lower coding units 620a and 620c, as the coding unit of the predetermined location. However, the aforementioned method, performed by the decoder 120, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

The decoder 120 may determine the width or height of each of the coding units 660a, 660b, and 660c by using the coordinates (xd, yd) that is information indicating the location of a top-left sample 670a of the left coding unit 660a, the coordinates (xe, ye) that is information indicating the location of a top-left sample 670b of the middle coding unit 660b, and the coordinates (xf, yf) that is information indicating a location of the top-left sample 670c of the right coding unit 660c. The decoder 120 may determine the respective sizes of the coding units 660a, 660b, and 660c by using the coordinates (xd, yd), (xe, ye), and (xf, yf) indicating the locations of the coding units 660a, 660b, and 660c.

According to an embodiment, the decoder 120 may determine the width of the left coding unit 660a to be xe-xd. The decoder 120 may determine the height of the left coding unit 660a to be the height of the current coding unit 650. According to an embodiment, the decoder 120 may determine the width of the middle coding unit 660b to be xf-xe. The decoder 120 may determine the height of the middle coding unit 660b to be the height of the current coding unit 650. According to an embodiment, the decoder 120 may determine the width or height of the right coding unit 660c by using the width or height of the current coding unit 650 or the widths or heights of the left and middle coding units 660a and 660b. The decoder 120 may determine a coding unit, which has a size different from that of the others, based on the determined widths and heights of the coding units 660a, 660b, and 660c. Referring to FIG. 6, the decoder 120 may determine the middle coding unit 660b, which has a size different from the sizes of the left and right coding units 660a and 660c, to be the coding unit of the predetermined location. However, the aforementioned method, performed by the decoder 120, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

However, locations of samples considered to determine locations of coding units are not limited to the aforementioned top-left locations, and information about arbitrary locations of samples included in the coding units may be used.

According to an embodiment, the decoder 120 may select a coding unit at a predetermined location from among an odd number of coding units determined by splitting the current coding unit, in consideration of the shape of the current coding unit. For example, when the current coding unit has a non-square shape, a width of which is longer than its height, the decoder 120 may determine the coding unit at the predetermined location in a horizontal direction. That is, the decoder 120 may determine one of coding units at different locations in a horizontal direction and may put a restriction on the coding unit. When the current coding unit has a non-square shape, a height of which is longer than its width, the decoder 120 may determine the coding unit at the predetermined location in a vertical direction. That is, the decoder 120 may determine one of coding units at different locations in a vertical direction and may put a restriction on the coding unit.

According to an embodiment, the decoder 120 may use information indicating respective locations of an even number of coding units, so as to determine the coding unit at the predetermined location from among the even number of coding units. The decoder 120 may determine an even number of coding units by splitting (binary splitting) the current coding unit, and may determine the coding unit at the predetermined location by using the information about the locations of the even number of coding units. An operation related thereto may correspond to the operation of determining a coding unit at a predetermined location (e.g., a center location) from among an odd number of coding units, which is described in detail above with reference to FIG. 6, and thus detailed descriptions thereof are not provided here.

According to an embodiment, when a non-square current coding unit is split into a plurality of coding units, predetermined information about a coding unit at a predetermined location may be used in a splitting process to determine the coding unit at the predetermined location from among the plurality of coding units. For example, the decoder 120 may use at least one of block shape information and split shape mode information, which is stored in a sample included in a middle coding unit, in a splitting process to determine a coding unit at a center location from among the plurality of coding units determined by splitting the current coding unit.

Referring to FIG. 6, the decoder 120 may split the current coding unit 600 into the plurality of coding units 620a, 620b, and 620c based on the split shape mode information, and may determine the coding unit 620b at a center location from among the plurality of the coding units 620a, 620b, and 620c. Furthermore, the decoder 120 may determine the coding unit 620b at the center location, in consideration of a location from which the split shape mode information is obtained. That is, the split shape mode information of the current coding unit 600 may be obtained from the sample 640 at a center location of the current coding unit 600 and, when the current coding unit 600 is split into the plurality of coding units 620*a*, 620*b*, and 620*c* based on the split shape mode information, the coding unit 620*b* including the sample 640 may be determined as the coding unit at the center location. However, information used to determine the coding unit at the center location is not limited to the split shape mode information, and various types of information may be used to determine the coding unit at the center location.

According to an embodiment, predetermined information for identifying the coding unit at the predetermined location may be obtained from a predetermined sample included in a coding unit to be determined. Referring to FIG. 6, the decoder 120 may use the split shape mode information, which is obtained from a sample at a predetermined location in the current coding unit 600 (e.g., a sample at a center location of the current coding unit 600), to determine a coding unit at a predetermined location from among the plurality of the coding units 620*a*, 620*b*, and 620*c* determined by splitting the current coding unit 600 (e.g., a coding unit at a center location from among a plurality of split coding units). That is, the decoder 120 may determine the sample at the predetermined location by considering a block shape of the current coding unit 600, may determine the coding unit 620*b* including a sample, from which predetermined information (e.g., the split shape mode information) is obtainable, from among the plurality of coding units 620*a*, 620*b*, and 620*c* determined by splitting the current coding unit 600, and may put a predetermined restriction on the coding unit 620*b*. Referring to FIG. 6, according to an embodiment, the decoder 120 may determine the sample 640 at the center location of the current coding unit 600 to be the sample from which the predetermined information is obtainable, and may put a predetermined restriction on the coding unit 620*b* including the sample 640, in a decoding operation. However, the location of the sample from which the predetermined information is obtainable is not limited to the aforementioned location, and may include arbitrary locations of samples included in the coding unit 620*b* to be determined for a restriction.

According to an embodiment, the location of the sample from which the predetermined information is obtainable may be determined based on the shape of the current coding unit 600. According to an embodiment, the block shape information may indicate whether the current coding unit has a square or non-square shape, and the location of the sample from which the predetermined information is obtainable may be determined based on the shape. For example, the decoder 120 may determine a sample located on a boundary for splitting at least one of a width and height of the current coding unit in half, as the sample from which the predetermined information is obtainable, by using at least one of information about the width of the current coding unit and information about the height of the current coding unit. As another example, when the block shape information of the current coding unit indicates a non-square shape, the decoder 120 may determine one of samples adjacent to a boundary for splitting a long side of the current coding unit in half, as the sample from which the predetermined information is obtainable.

According to an embodiment, when the current coding unit is split into a plurality of coding units, the decoder 120 may use the split shape mode information so as to determine a coding unit at a predetermined location from among the plurality of coding units. According to an embodiment, the decoder 120 may obtain the split shape mode information from a sample at a predetermined location in a coding unit, and may split the plurality of coding units, which are generated by splitting the current coding unit, by using the split shape mode information, which is obtained from the sample of the predetermined location in each of the plurality of coding units. That is, a coding unit may be recursively split based on the split shape mode information, which is obtained from the sample at the predetermined location in each coding unit. An operation of recursively splitting a coding unit is described above with reference to FIG. 5, and thus detailed descriptions thereof are not provided here.

According to an embodiment, the decoder 120 may determine one or more coding units by splitting the current coding unit, and may determine an order of decoding the one or more coding units, based on a predetermined block (e.g., the current coding unit).

Figure 7:
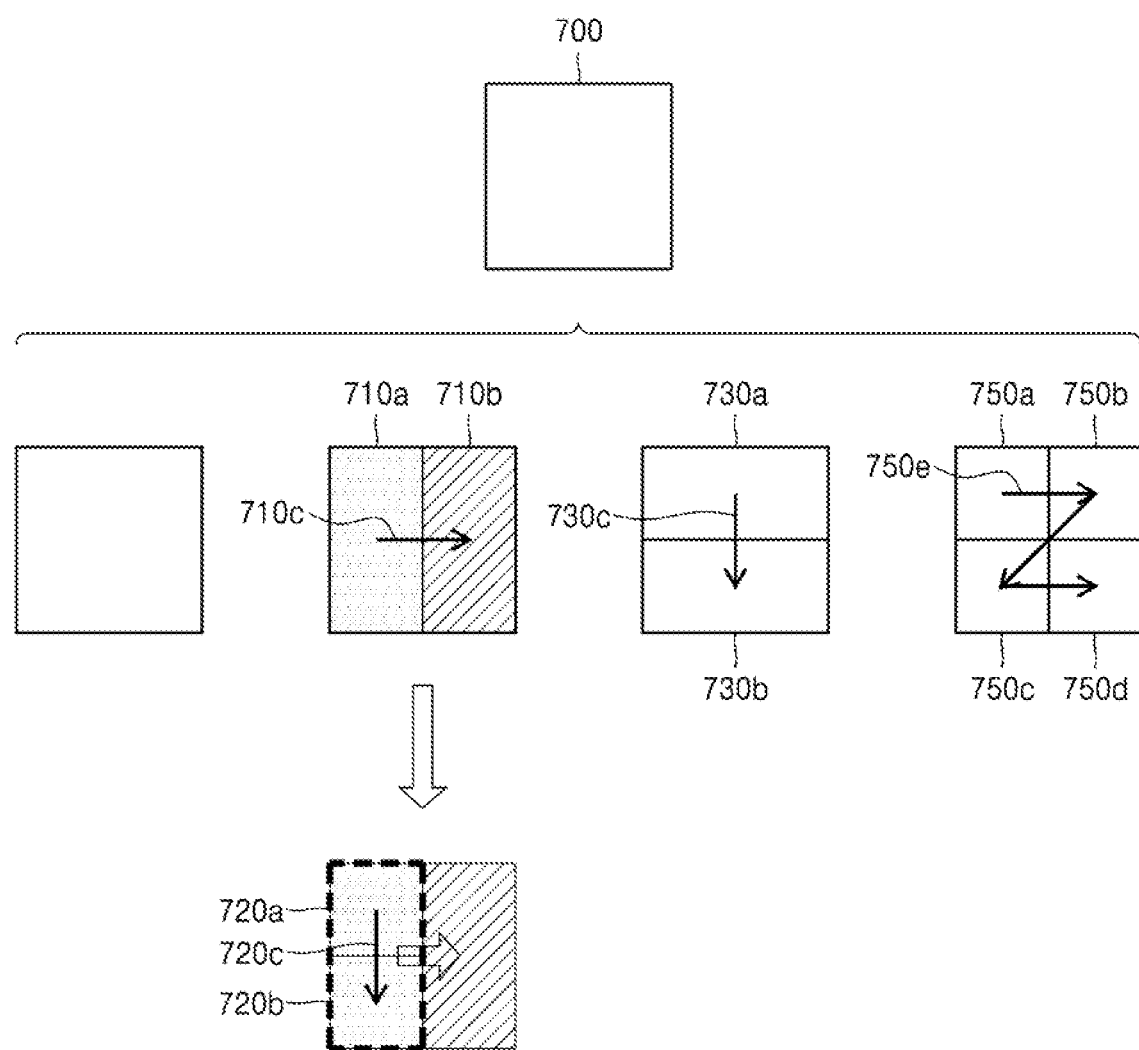
FIG. 7 illustrates an order of processing a plurality of coding units when the image decoding apparatus determines the plurality of coding units by splitting a current coding unit, according to an embodiment.

FIG. 7 illustrates an order of processing a plurality of coding units when the decoder 120 determines the plurality of coding units by splitting a current coding unit, according to an embodiment.

According to an embodiment, the decoder 120 may determine second coding units 710*a* and 710*b* by splitting a first coding unit 700 in a vertical direction, may determine second coding units 730*a* and 730*b* by splitting the first coding unit 700 in a horizontal direction, or may determine second coding units 750*a* to 750*d* by splitting the first coding unit 700 in vertical and horizontal directions, based on split shape mode information.

Referring to FIG. 7, the decoder 120 may determine to process the second coding units 710*a* and 710*b* in a horizontal direction order 710*c*, the second coding units 710*a* and 710*b* being determined by splitting the first coding unit 700 in a vertical direction. The decoder 120 may determine to process the second coding units 730*a* and 730*b* in a vertical direction order 730*c*, the second coding units 730*a* and 730*b* having been determined by splitting the first coding unit 700 in a horizontal direction. The decoder 120 may determine the second coding units 750*a*, 750*b*, 750*c*, and 750*d*, which are determined by splitting the first coding unit 700 in vertical and horizontal directions, according to a predetermined order (e.g., a raster scan order or Z-scan order 750*e*) by which coding units in a row are processed and then coding units in a next row are processed.

According to an embodiment, the decoder 120 may recursively split coding units. Referring to FIG. 7, the decoder 120 may determine the plurality of coding units 710*a* and 710*b*, 730*a* and 730*b*, or 750*a*, 750*b*, 750*c*, and 750*d* by splitting the first coding unit 700, and may recursively split each of the determined plurality of coding units 710*a* and 710*b*, 730*a* and 730*b*, or 750*a*, 750*b*, 750*c*, and 750*d*. A splitting method of the plurality of coding units 710*a* and 710*b*, 730*a* and 730*b*, or 750*a*, 750*b*, 750*c*, and 750*d* may correspond to a splitting method of the first coding unit 700. Accordingly, each of the plurality of coding units 710*a* and 710*b*, 730*a* and 730*b*, or 750*a*, 750*b*, 750*c*, and 750*d* may be independently split into a plurality of coding units. Referring to FIG. 7, the decoder 120 may determine the second coding units 710*a* and 710*b* by splitting the first coding unit 700 in a vertical direction, and may determine to independently split each of the second coding units 710*a* and 710*b* or not to split the second coding units 710*a* and 710*b*.

According to an embodiment, the decoder 120 may determine third coding units 720*a* and 720*b* by splitting the left second coding unit 710*a* in a horizontal direction, and may not split the right second coding unit 710*b*.

According to an embodiment, a processing order of coding units may be determined based on an operation of splitting a coding unit. In other words, a processing order of split coding units may be determined based on a processing order of coding units immediately before being split. The decoder 120 may determine a processing order of the third coding units 720a and 720b determined by splitting the left second coding unit 710a, independently of the right second coding unit 710b. Because the third coding units 720a and 720b are determined by splitting the left second coding unit 710a in a horizontal direction, the third coding units 720a and 720b may be processed in a vertical direction order 720c. Because the left and right second coding units 710a and 710b are processed in the horizontal direction order 710c, the right second coding unit 710b may be processed after the third coding units 720a and 720b included in the left second coding unit 710a are processed in the vertical direction order 720c. It should be construed that an operation of determining a processing order of coding units based on a coding unit before being split is not limited to the aforementioned example, and various methods may be used to independently process coding units, which are split and determined to various shapes, in a predetermined order.

Figure 8:
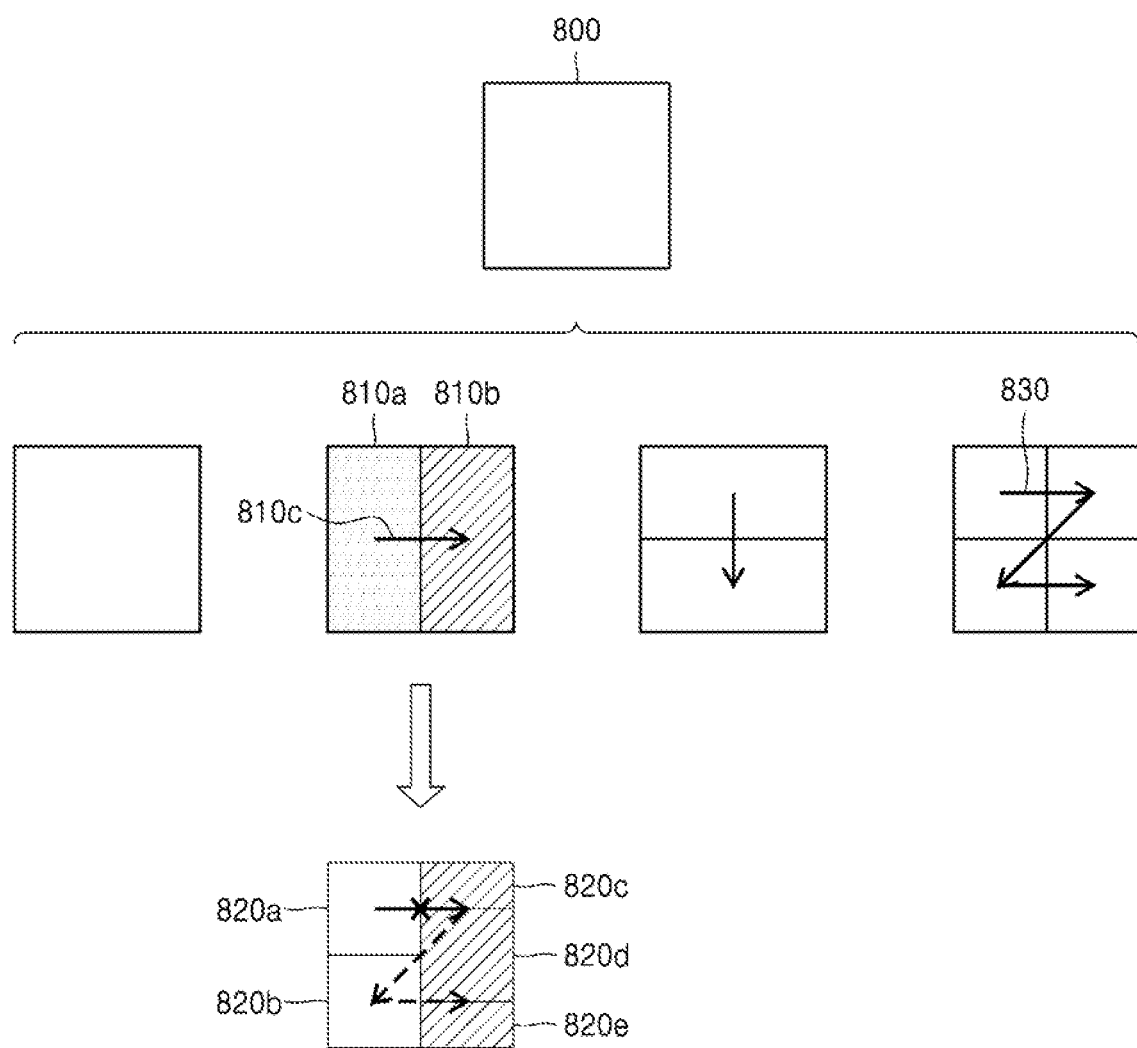
FIG. 8 illustrates a process, performed by the image decoding apparatus, of determining that a current coding unit is to be split into an odd number of coding units, when the coding units are not processable in a predetermined order, according to an embodiment.

FIG. 8 illustrates a process, performed by the decoder 120, of determining that a current coding unit is to be split into an odd number of coding units, when the coding units are not process sable in a predetermined order, according to an embodiment.

According to an embodiment, the decoder 120 may determine that the current coding unit is to be split into an odd number of coding units, based on obtained split shape mode information. Referring to FIG. 8, a square first coding unit 800 may be split into non-square second coding units 810a and 810b, and the second coding units 810a and 810b may be independently split into third coding units 820a and 820b, and 820c, 820d, and 820e. According to an embodiment, the decoder 120 may determine the plurality of third coding units 820a and 820b by splitting the left second coding unit 810a in a horizontal direction, and may split the right second coding unit 810b into the odd number of third coding units 820c, 820d, and 820e.

According to an embodiment, the decoder 120 may determine whether any coding unit is to be split into an odd number of coding units, by determining whether the third coding units 820a and 820b, and 820c, 820d, and 820e are processable in a predetermined order. Referring to FIG. 8, the decoder 120 may determine the third coding units 820a and 820b, and 820c, 820d, and 820e by recursively splitting the first coding unit 800. The decoder 120 may determine whether any of the first coding unit 800, the second coding units 810a and 810b, or the third coding units 820a and 820b, and 820c, 820d, and 820e is to be split into an odd number of coding units, based on at least one of the block shape information and the split shape mode information. For example, the second coding unit 810b located in the right from among the second coding units 810a and 810b may be split into an odd number of third coding units 820c, 820d, and 820e. A processing order of a plurality of coding units included in the first coding unit 800 may be a predetermined order (e.g., a Z-scan order 830), and the decoder 120 may determine whether the third coding units 820c, 820d, and 820e, which are determined by splitting the right second coding unit 810b into an odd number of coding units, satisfy a condition for processing in the predetermined order.

According to an embodiment, the decoder 120 may determine whether the third coding units 820a and 820b, and 820c, 820d, and 820e included in the first coding unit 800 satisfy the condition for processing in the predetermined order, and the condition relates to whether at least one of a width and height of the second coding units 810a and 810b is to be split in half along a boundary of the third coding units 820a and 820b, and 820c, 820d, and 820e. For example, the third coding units 820a and 820b determined when the height of the left second coding unit 810a of the non-square shape is split in half may satisfy the condition. It may be determined that the third coding units 820c, 820d, and 820e do not satisfy the condition because the boundaries of the third coding units 820c, 820d, and 820e determined when the right second coding unit 810b is split into three coding units are unable to split the width or height of the right second coding unit 810b in half. When the condition is not satisfied as described above, the decoder 120 may determine disconnection of a scan order, and may determine that the right second coding unit 810b is to be split into an odd number of coding units, based on a result of the determination. According to an embodiment, when a coding unit is split into an odd number of coding units, the decoder 120 may put a predetermined restriction on a coding unit at a predetermined location from among the split coding units. The restriction or the predetermined location is described above in relation to various embodiments, and thus detailed descriptions thereof are not provided herein.

Figure 9:
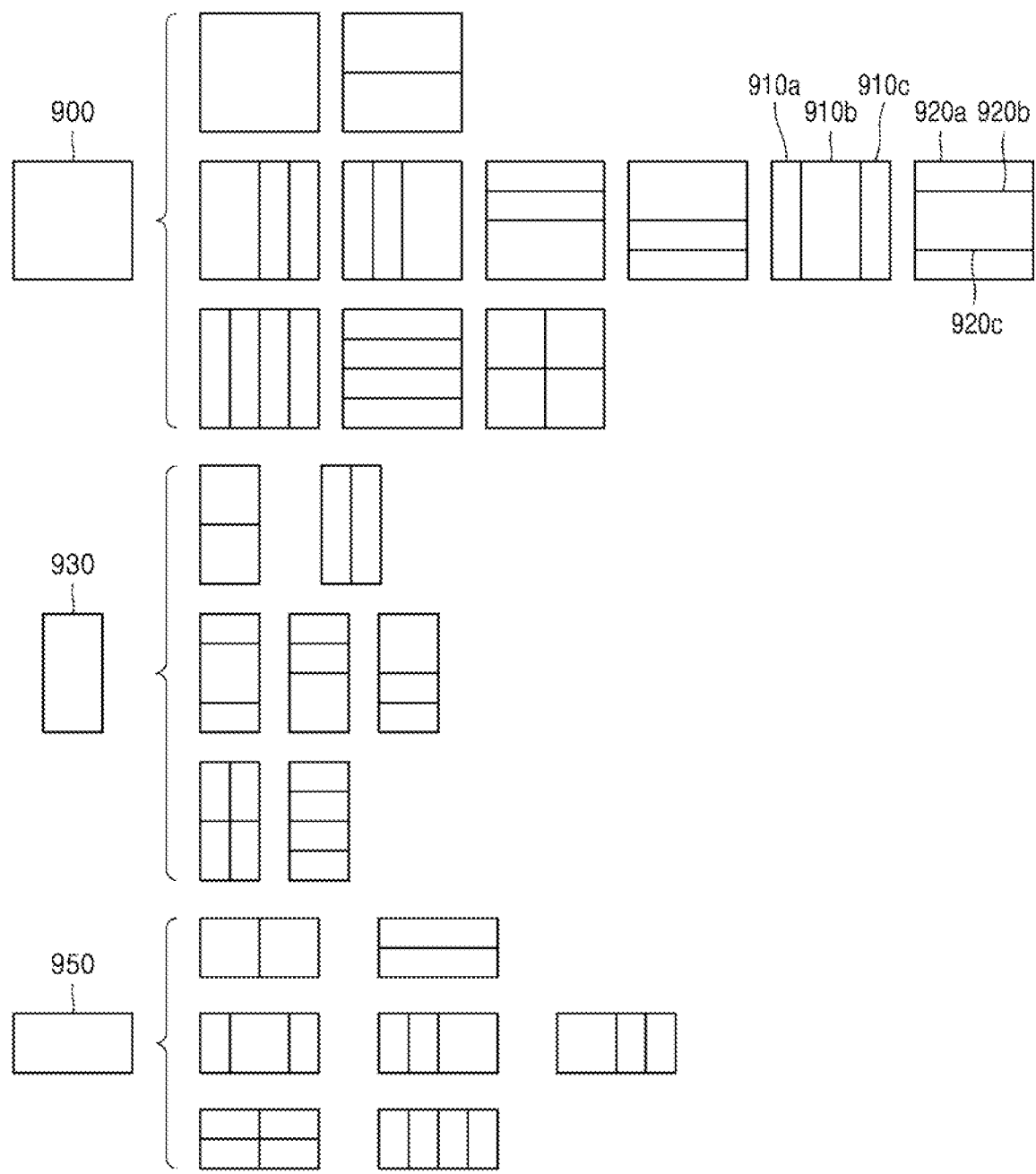
FIG. 9 illustrates a process, performed by the image decoding apparatus, of determining at least one coding unit by splitting a first coding unit, according to an embodiment.

FIG. 9 illustrates a process, performed by the decoder 120, of determining at least one coding unit by splitting a first coding unit 900, according to an embodiment.

According to an embodiment, the decoder 120 may split the first coding unit 900, based on split shape mode information that is obtained through the bitstream obtainer 110. The square first coding unit 900 may be split into four square coding units, or may be split into a plurality of non-square coding units. For example, referring to FIG. 9, when the first coding unit 900 is a square and the split shape mode information indicates to split the first coding unit 900 into non-square coding units, the decoder 120 may split the first coding unit 900 into a plurality of non-square coding units. In detail, when the split shape mode information indicates to determine an odd number of coding units by splitting the first coding unit 900 in a horizontal direction or a vertical direction, the decoder 120 may split the square first coding unit 900 into an odd number of coding units, e.g., second coding units 910a, 910b, and 910c determined by splitting the square first coding unit 900 in a vertical direction or second coding units 920a, 920b, and 920c determined by splitting the square first coding unit 900 in a horizontal direction.

According to an embodiment, the decoder 120 may determine whether the second coding units 910a, 910b, 910c, 920a, 920b, and 920c included in the first coding unit 900 satisfy a condition for processing in a predetermined order, and the condition relates to whether at least one of a width and height of the first coding unit 900 is to be split in half along a boundary of the second coding units 910a, 910b, 910c, 920a, 920b, and 920c. Referring to FIG. 9, because boundaries of the second coding units 910a, 910b, and 910c determined by splitting the square first coding unit 900 in a vertical direction do not split the width of the first coding unit 900 in half, it may be determined that the first coding unit 900 does not satisfy the condition for processing in the predetermined order. In addition, because boundaries of the second coding units 920a, 920b, and 920c determined by splitting the square first coding unit 900 in a horizontal direction do not split the width of the first coding unit 900 in half, it may be determined that the first coding unit 900 does not satisfy the condition for processing in the predetermined order. When the condition is not satisfied as described above, the decoder 120 may determine disconnection of a scan order, and may determine that the first coding unit 900 is to be split into an odd number of coding units, based on a result of the determination. According to an embodiment, when a coding unit is split into an odd number of coding units, the decoder 120 may put a predetermined restriction on a coding unit at a predetermined location from among the split coding units. The restriction or the predetermined location is described above in relation to various embodiments, and thus detailed descriptions thereof are not provided herein.

Referring to FIG. 9, the decoder 120 may split the square first coding unit 900 or a non-square first coding unit 930 or 950 into various-shaped coding units.

Figure 10:
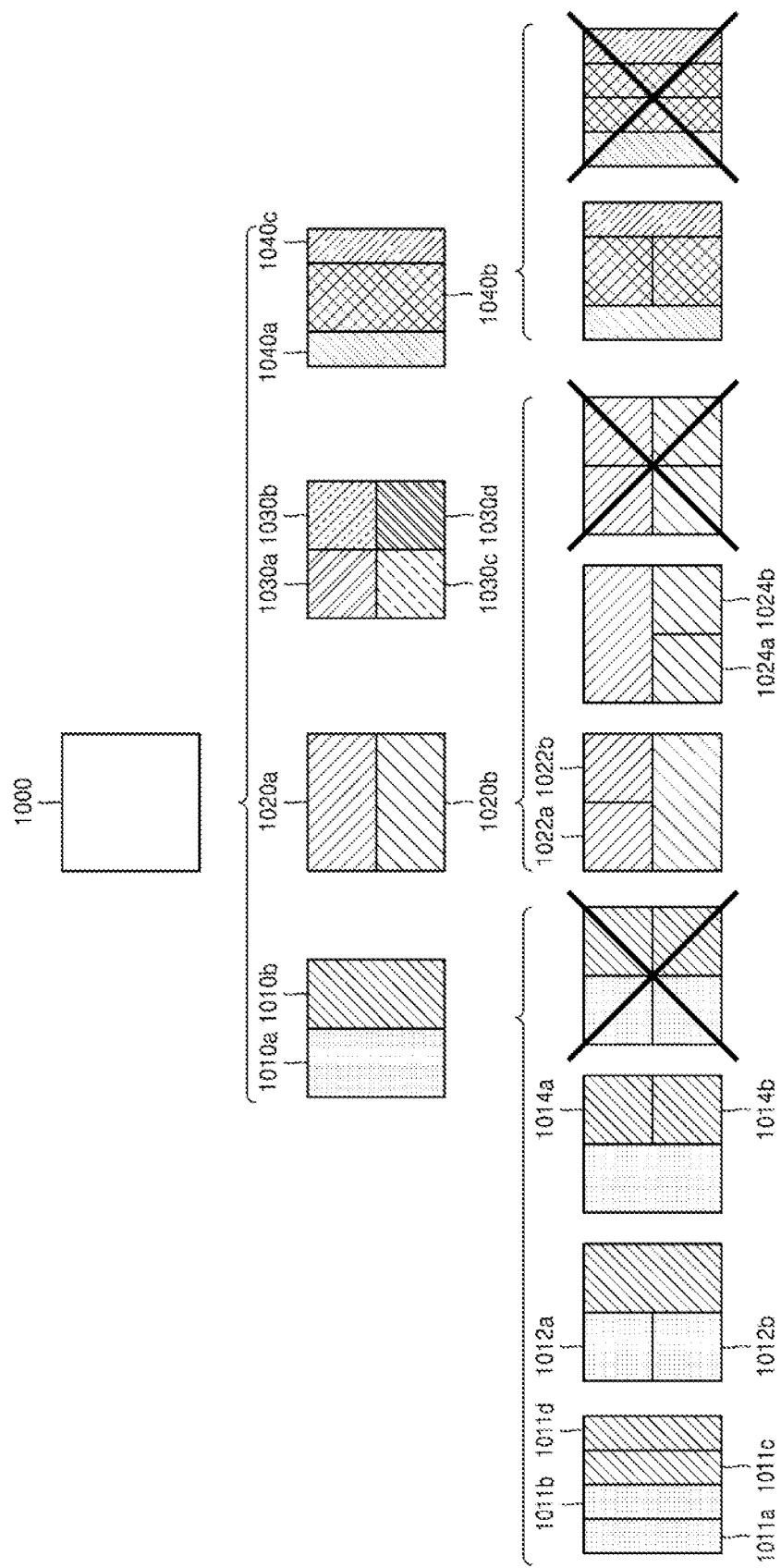
FIG. 10 illustrates that a shape into which a second coding unit is splittable is restricted when the second coding unit having a non-square shape, which is determined by splitting a first coding unit, satisfies a predetermined condition, according to an embodiment.

FIG. 10 illustrates that a split shape of a second coding unit is restricted when the second coding unit having a non-square shape, which is determined by being split from a first coding unit 1000, satisfies a predetermined condition, according to an embodiment.

According to an embodiment, the decoder 120 may determine to split the square first coding unit 1000 into non-square second coding units 1010a and 1010b or 1020a and 1020b, based on split shape mode information that is obtained by the bitstream obtainer 110. The second coding units 1010a and 1010b or 1020a and 1020b may be independently split. Accordingly, the decoder 120 may determine to split or not to split each of the second coding units 1010a and 1010b or 1020a and 1020b into a plurality of coding units, based on the split shape mode information of each of the second coding units 1010a and 1010b or 1020a and 1020b. According to an embodiment, the decoder 120 may determine third coding units 1012a and 1012b by splitting the non-square left second coding unit 1010a, which is determined by splitting the first coding unit 1000 in a vertical direction, in a horizontal direction. However, when the left second coding unit 1010a is split in a horizontal direction, the decoder 120 may restrict the right second coding unit 1010b to not be split in a horizontal direction in which the left second coding unit 1010a is split. When third coding units 1014a and 1014b are determined by splitting the right second coding unit 1010b in a same direction, because the left second coding unit 1010a and the right second coding unit 1010b are independently split in a horizontal direction, the third coding units 1012a and 1012b or 1014a and 1014b may be determined. However, this case serves equally as a case in which the decoder 120 splits the first coding unit 1000 into four square second coding units 1030a, 1030b, 1030c, and 1030d, based on the split shape mode information, and may be inefficient in terms of image decoding.

According to an embodiment, the decoder 120 may determine third coding units 1022a and 1022b or 1024a and 1024b by splitting the non-square second coding unit 1020a or 1020b, which is determined by splitting the first coding unit 1000 in a horizontal direction, in a vertical direction. However, when a second coding unit (e.g., the upper second coding unit 1020a) is split in a vertical direction, for the aforementioned reason, the decoder 120 may restrict the other second coding unit (e.g., the lower second coding unit 1020b) to not be split in a vertical direction in which the upper second coding unit 1020a is split.

According to an embodiment, the decoder 120 may determine non-square second coding units 1040a, 1040b, and 1040c by ternary splitting the square first coding unit 1000, based on split shape mode information obtained via the bitstream obtainer 110. The second coding units 1040a, 1040b, and 1040c may be independently split. Accordingly, the decoder 120 may determine to split or to not split the second coding units 1040a, 1040b, and 1040c into a plurality of coding units, based on a plurality of pieces of the split shape mode information related to the second coding units 1040a, 1040b, and 1040c. According to an embodiment, when the decoder 120 determines to not split the non-square second coding unit 1040a in the left and the non-square second coding unit 1040c in the right which are determined by ternary vertically splitting the first coding unit 1000, the decoder 120 may restrict a split shape of the second coding unit 1040b at a center location to a split shape other than binary vertical split. Because the above split generates a same result as a result (i.e., third coding units 1011a, 1011b, 1011c, and 1011d) obtained by binary vertically splitting each of the second coding units 1010a and 1010b that are determined by binary vertically splitting the first coding unit 1000, and the same result may be inefficient in terms of image decoding.

When splitting of a coding unit to a predetermined split shape is not allowed according to a split rule, the decoder 120 may not parse, from a bitstream, information necessary to determine the predetermined split shape. For example, when horizontal splitting of the coding unit is not allowed, the decoder 120 may not parse, from the bitstream, split direction information indicating a horizontal direction or a vertical direction. Also, when binary splitting of the coding unit is not allowed, the decoder 120 may not parse, from the bitstream, split type information indicating binary split or ternary split.

Figure 11:
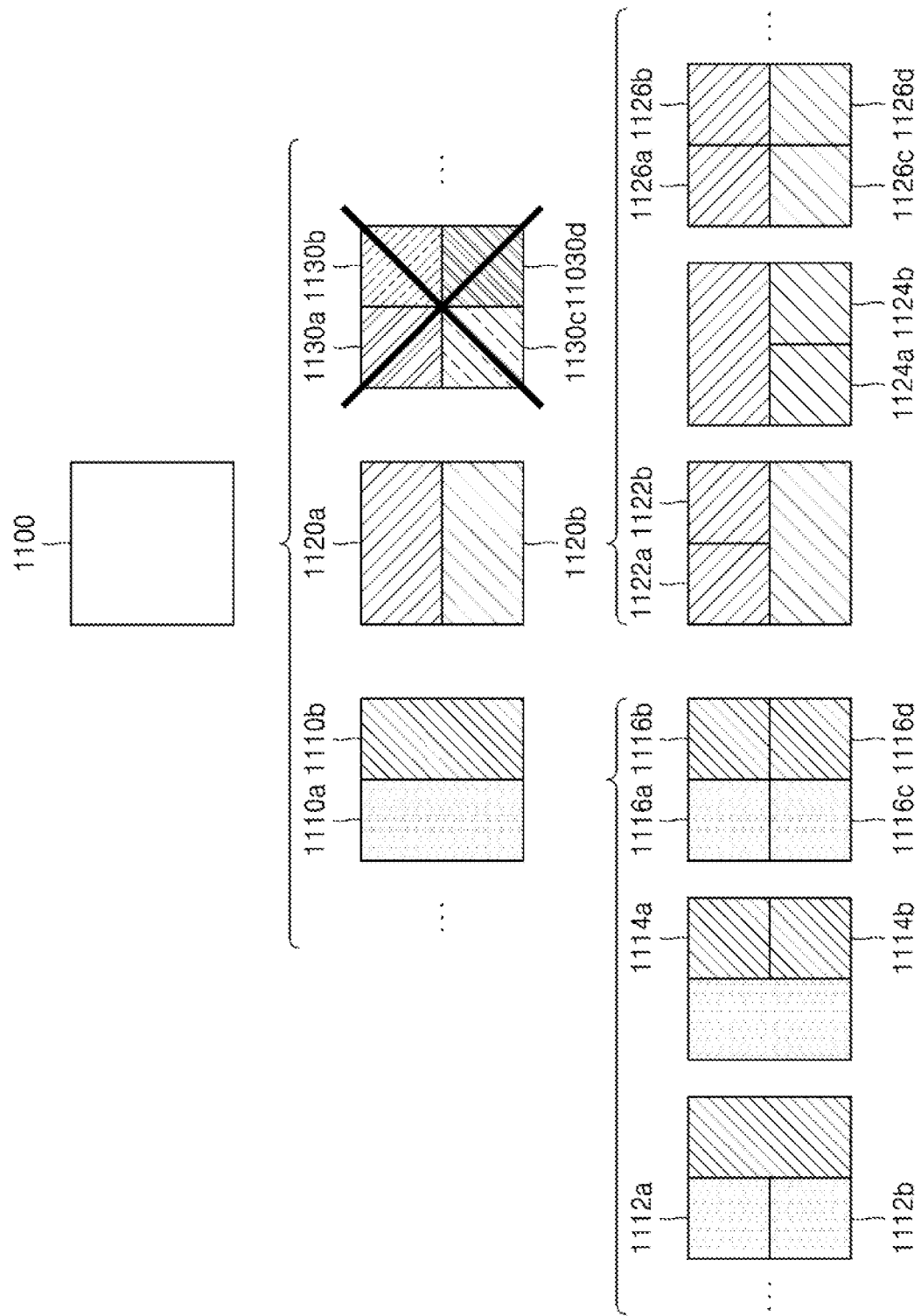
FIG. 11 illustrates a process, performed by the image decoding apparatus, of splitting a square coding unit when split shape mode information indicates that the square coding unit is to not be split into four square coding units, according to an embodiment.

FIG. 11 illustrates a process, performed by the decoder 120, of splitting a square coding unit when split shape mode information indicates that the square coding unit is to not be split into four square coding units, according to an embodiment.

According to an embodiment, the decoder 120 may determine second coding units 1110a and 1110b or 1120a and 1120b, etc. by splitting a first coding unit 1100, based on split shape mode information. The split shape mode information may include information about various methods of splitting a coding unit, but the information about various splitting methods may not include information for splitting a coding unit into four square coding units. Based on the split shape mode information, the decoder 120 does not split the square first coding unit 1100 into four square second coding units 1130a, 1130b, 1130c, and 1130d. The decoder 120 may determine the non-square second coding units 1110a and 1110b or 1120a and 1120b, etc., based on the split shape mode information.

According to an embodiment, the decoder 120 may independently split the non-square second coding units 1110a and 1110b or 1120a and 1120b, etc. Each of the second coding units 1110a and 1110b or 1120a and 1120b, etc. may be recursively split in a predetermined order, and this splitting method may correspond to a method of splitting the first coding unit 1100, based on the split shape mode information.

For example, the decoder 120 may determine square third coding units 1112a and 1112b split from the left second coding unit 1110a in a horizontal direction, and may determine square third coding units 1114a and 1114b split from the right second coding unit 1110b in a horizontal direction. Furthermore, the decoder 120 may determine square third coding units 1116a, 1116b, 1116c, and 1116d that are split from both the left second coding unit 1110a and the right second coding unit 1110b in a horizontal direction. In this case, coding units having the same shape as the four square second coding units 1130*a*, 1130*b*, 1130*c*, and 1130*d* split from the first coding unit 1100 may be determined.

As another example, the decoder 120 may determine square third coding units 1122*a* and 1122*b* split from the upper second coding unit 1120*a* in a vertical direction, and may determine square third coding units 1124*a* and 1124*b* split from the lower second coding unit 1120*b* in a vertical direction. Furthermore, the decoder 120 may determine square third coding units 1126*a*, 1126*b*, 1126*c*, and 1126*d* that are split from both the upper second coding unit 1120*a* and the lower second coding unit 1120*b* in a vertical direction. In this case, coding units having the same shape as the four square second coding units 1130*a*, 1130*b*, 1130*c*, and 1130*d* split from the first coding unit 1100 may be determined.

Figure 12:
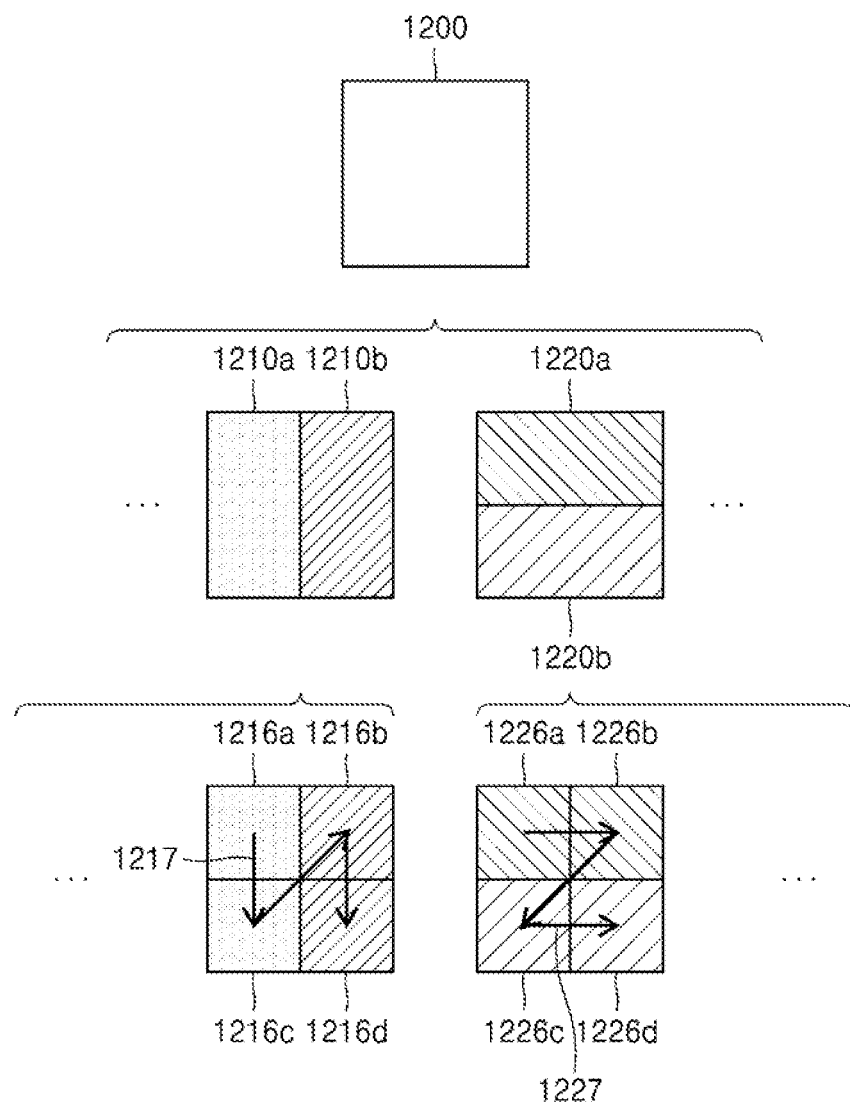
FIG. 12 illustrates that a processing order between a plurality of coding units may be changed depending on a process of splitting a coding unit, according to an embodiment.

FIG. 12 illustrates that a processing order between a plurality of coding units may be changed depending on a process of splitting a coding unit, according to an embodiment.

According to an embodiment, the decoder 120 may split a first coding unit 1200, based on split shape mode information. When a block shape indicates a square shape and the split shape mode information indicates to split the first coding unit 1200 in at least one of horizontal and vertical directions, the decoder 120 may determine second coding units 1210*a* and 1210*b* or 1220*a* and 1220*b*, etc. by splitting the first coding unit 1200. Referring to FIG. 12, the non-square second coding units 1210*a* and 1210*b* or 1220*a* and 1220*b* determined by splitting the first coding unit 1200 in only a horizontal direction or vertical direction may be independently split based on the split shape mode information of each coding unit. For example, the decoder 120 may determine third coding units 1216*a*, 1216*b*, 1216*c*, and 1216*d* by splitting the second coding units 1210*a* and 1210*b*, which are generated by splitting the first coding unit 1200 in a vertical direction, in a horizontal direction, and may determine third coding units 1226*a*, 1226*b*, 1226*c*, and 1226*d* by splitting the second coding units 1220*a* and 1220*b*, which are generated by splitting the first coding unit 1200 in a horizontal direction, in a vertical direction. An operation of splitting the second coding units 1210*a* and 1210*b* or 1220*a* and 1220*b* is described above with reference to FIG. 11, and thus detailed descriptions thereof are not provided herein.

According to an embodiment, the decoder 120 may process coding units in a predetermined order. An operation of processing coding units in a predetermined order is described above with reference to FIG. 7, and thus detailed descriptions thereof are not provided herein. Referring to FIG. 12, the decoder 120 may determine four square third coding units 1216*a*, 1216*b*, 1216*c*, and 1216*d*, or 1226*a*, 1226*b*, 1226*c*, and 1226*d* by splitting the square first coding unit 1200. According to an embodiment, the decoder 120 may determine processing orders of the third coding units 1216*a*, 1216*b*, 1216*c*, and 1216*d*, or 1226*a*, 1226*b*, 1226*c*, and 1226*d*, based on a split shape by which the first coding unit 1200 is split.

According to an embodiment, the decoder 120 may determine the third coding units 1216*a*, 1216*b*, 1216*c*, and 1216*d* by splitting the second coding units 1210*a* and 1210*b* generated by splitting the first coding unit 1200 in a vertical direction, in a horizontal direction, and may process the third coding units 1216*a*, 1216*b*, 1216*c*, and 1216*d* in a processing order 1217 for initially processing the third coding units 1216*a* and 1216*c*, which are included in the left second coding unit 1210*a*, in a vertical direction and then processing the third coding units 1216*b* and 1216*d*, which are included in the right second coding unit 1210*b*, in a vertical direction.

According to an embodiment, the decoder 120 may determine the third coding units 1226*a*, 1226*b*, 1226*c*, and 1226*d* by splitting the second coding units 1220*a* and 1220*b* generated by splitting the first coding unit 1200 in a horizontal direction, in a vertical direction, and may process the third coding units 1226*a*, 1226*b*, 1226*c*, and 1226*d* in a processing order 1227 for initially processing the third coding units 1226*a* and 1226*b*, which are included in the upper second coding unit 1220*a*, in a horizontal direction and then processing the third coding unit 1226*c* and 1226*d*, which are included in the lower second coding unit 1220*b*, in a horizontal direction.

Referring to FIG. 12, the square third coding units 1216*a*, 1216*b*, 1216*c*, and 1216*d*, and 1226*a*, 1226*b*, 1226*c*, and 1226*d* may be determined by splitting the second coding units 1210*a* and 1210*b*, and 1220*a* and 1220*b*, respectively. Although the second coding units 1210*a* and 1210*b* are determined by splitting the first coding unit 1200 in a vertical direction differently from the second coding units 1220*a* and 1220*b* which are determined by splitting the first coding unit 1200 in a horizontal direction, the third coding units 1216*a*, 1216*b*, 1216*c*, and 1216*d*, and 1226*a*, 1226*b*, 1226*c*, and 1226*d* split therefrom eventually show same-shaped coding units split from the first coding unit 1200. Accordingly, by recursively splitting a coding unit in different manners based on the split shape mode information, the decoder 120 may process a plurality of coding units in different orders even when the coding units are eventually determined to have the same shape.

FIG. 13 illustrates a process of determining a depth of a coding unit as a shape and size of the coding unit change, when the coding unit is recursively split such that a plurality of coding units are determined, according to an embodiment.

According to an embodiment, the decoder 120 may determine the depth of the coding unit, based on a predetermined criterion. For example, the predetermined criterion may be the length of a long side of the coding unit. When the length of a long side of a coding unit before being split is 2n times (n>0) the length of a long side of a split current coding unit, the decoder 120 may determine that a depth of the current coding unit is increased from a depth of the coding unit before being split, by n. In the following descriptions, a coding unit having an increased depth is expressed as a coding unit of a deeper depth.

Referring to FIG. 13, according to an embodiment, the decoder 120 may determine a second coding unit 1302 and a third coding unit 1304 of deeper depths by splitting a square first coding unit 1300 based on block shape information indicating a square shape (for example, the block shape information may be expressed as '0: SQUARE'). Assuming that the size of the square first coding unit 1300 is 2N×2N, the second coding unit 1302 determined by splitting a width and height of the first coding unit 1300 in ½ may have a size of N×N. Furthermore, the third coding unit 1304 determined by splitting a width and height of the second coding unit 1302 in ½ may have a size of N/2×N/2. In this case, a width and height of the third coding unit 1304 are ¼ times those of the first coding unit 1300. When a depth of the first coding unit 1300 is D, a depth of the second coding unit 1302, the width and height of which are ½ times those of the first coding unit 1300, may be D+1, and a depth of the third coding unit 1304, the width and height of which are ¼ times those of the first coding unit 1300, may be D+2.

According to an embodiment, the decoder 120 may determine a second coding unit 1312 or 1322 and a third coding unit 1314 or 1324 of deeper depths by splitting a non-square first coding unit 1310 or 1320 based on block shape information indicating a non-square shape (for example, the block shape information may be expressed as '1: NS_VER' indicating a non-square shape, a height of which is longer than its width, or as '2: NS_HOR' indicating a non-square shape, a width of which is longer than its height).

The decoder 120 may determine a second coding unit 1302, 1312, or 1322 by splitting at least one of a width and height of the first coding unit 1310 having a size of N×2N. That is, the decoder 120 may determine the second coding unit 1302 having a size of N×N or the second coding unit 1322 having a size of N×N/2 by splitting the first coding unit 1310 in a horizontal direction, or may determine the second coding unit 1312 having a size of N/2×N by splitting the first coding unit 1310 in horizontal and vertical directions.

According to an embodiment, the decoder 120 may determine the second coding unit 1302, 1312, or 1322 by splitting at least one of a width and height of the first coding unit 1320 having a size of 2N×N. That is, the decoder 120 may determine the second coding unit 1302 having a size of N×N or the second coding unit 1312 having a size of N/2×N by splitting the first coding unit 1320 in a vertical direction, or may determine the second coding unit 1322 having a size of N×N/2 by splitting the first coding unit 1320 in horizontal and vertical directions.

According to an embodiment, the decoder 120 may determine a third coding unit 1304, 1314, or 1324 by splitting at least one of a width and height of the second coding unit 1302 having a size of N×N. That is, the decoder 120 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to an embodiment, the decoder 120 may determine the third coding unit 1304, 1314, or 1324 by splitting at least one of a width and height of the second coding unit 1312 having a size of N/2×N. That is, the decoder 120 may determine the third coding unit 1304 having a size of N/2×N/2 or the third coding unit 1324 having a size of N/2×N/4 by splitting the second coding unit 1312 in a horizontal direction, or may determine the third coding unit 1314 having a size of N/4×N/2 by splitting the second coding unit 1312 in vertical and horizontal directions.

According to an embodiment, the decoder 120 may determine the third coding unit 1304, 1314, or 1324 by splitting at least one of a width and height of the second coding unit 1322 having a size of N×N/2. That is, the decoder 120 may determine the third coding unit 1304 having a size of N/2×N/2 or the third coding unit 1314 having a size of N/4×N/2 by splitting the second coding unit 1322 in a vertical direction, or may determine the third coding unit 1324 having a size of N/2×N/4 by splitting the second coding unit 1322 in vertical and horizontal directions.

According to an embodiment, the decoder 120 may split the square coding unit 1300, 1302, or 1304 in a horizontal or vertical direction. For example, the decoder 120 may determine the first coding unit 1310 having a size of N×2N by splitting the first coding unit 1300 having a size of 2N×2N in a vertical direction, or may determine the first coding unit 1320 having a size of 2N×N by splitting the first coding unit 1300 in a horizontal direction. According to an embodiment, when a depth is determined based on the length of the longest side of a coding unit, a depth of a coding unit determined by splitting the first coding unit 1300 having a size of 2N×2N in a horizontal or vertical direction may be the same as the depth of the first coding unit 1300.

According to an embodiment, a width and height of the third coding unit 1314 or 1324 may be ¼ times those of the first coding unit 1310 or 1320. When a depth of the first coding unit 1310 or 1320 is D, a depth of the second coding unit 1312 or 1322, the width and height of which are ½ times those of the first coding unit 1310 or 1320, may be D+1, and a depth of the third coding unit 1314 or 1324, the width and height of which are ¼ times those of the first coding unit 1310 or 1320, may be D+2.

Figure 14:
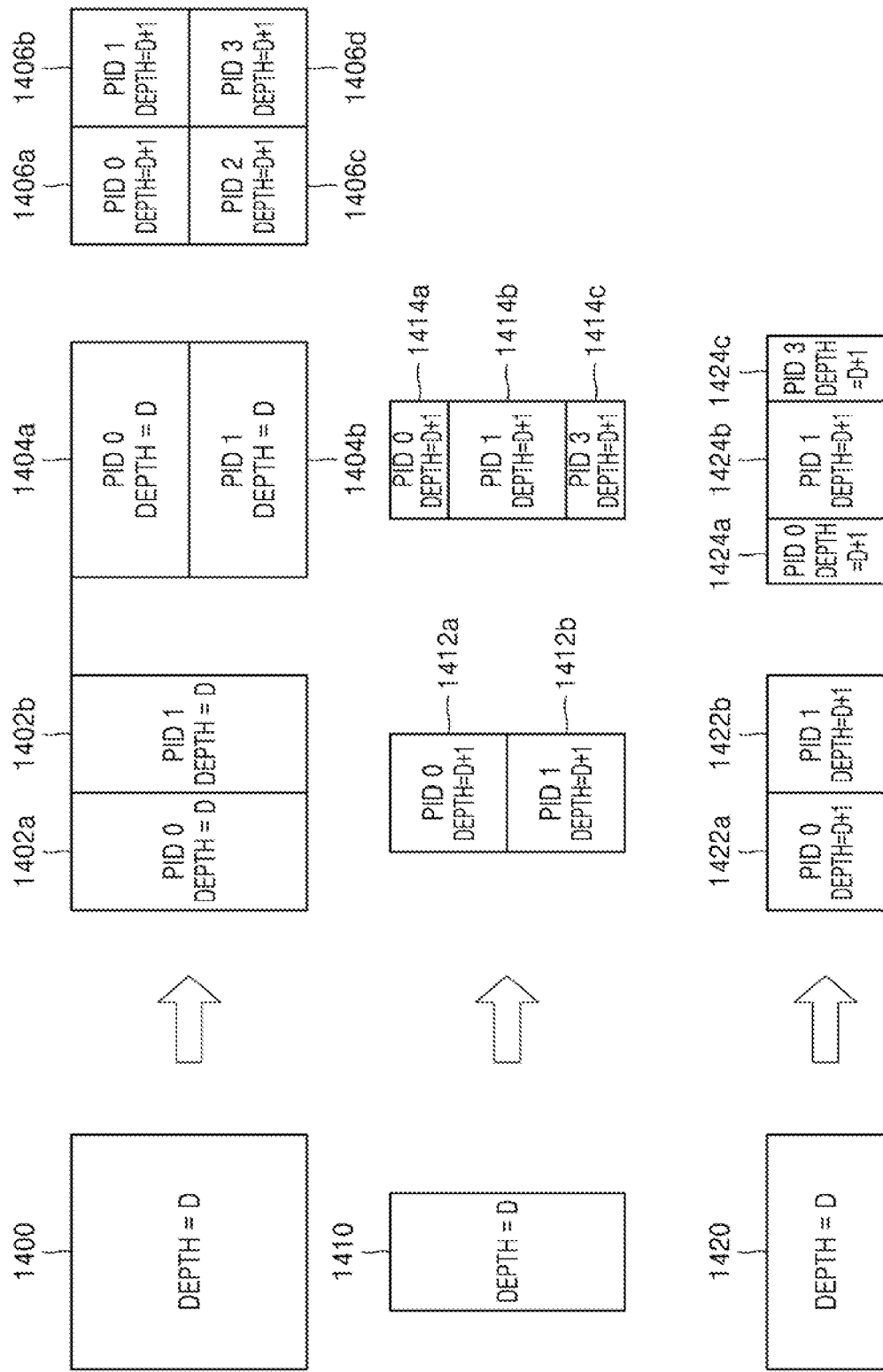
FIG. 14 illustrates depths that are determinable based on shapes and sizes of coding units, and part indexes (PIDs) that are for distinguishing the coding units, according to an embodiment.

FIG. 14 illustrates depths that are determinable based on shapes and sizes of coding units, and part indexes (PIDs) that are for distinguishing the coding units, according to an embodiment.

According to an embodiment, the decoder 120 may determine various-shape second coding units by splitting a square first coding unit 1400. Referring to FIG. 14, the decoder 120 may determine second coding units 1402a and 1402b, 1404a and 1404b, or 1406a, 1406b, 1406c, and 1406d by splitting the first coding unit 1400 in at least one of vertical and horizontal directions based on split shape mode information. That is, the decoder 120 may determine the second coding units 1402a and 1402b, 1404a and 1404b, or 1406a, 1406b, 1406c, and 1406d, based on the split shape mode information of the first coding unit 1400.

According to an embodiment, depths of the second coding units 1402a and 1402b, 1404a and 1404b, or 1406a, 1406b, 1406c, and 1406d that are determined based on the split shape mode information of the square first coding unit 1400 may be determined based on the length of a long side thereof. For example, because the length of a side of the square first coding unit 1400 equals the length of a long side of the non-square second coding units 1402a and 1402b, and 1404a and 1404b, the first coding unit 1400 and the non-square second coding units 1402a and 1402b, and 1404a and 1404b may have the same depth, e.g., D. However, when the decoder 120 splits the first coding unit 1400 into the four square second coding units 1406a, 1406b, 1406c, and 1406d based on the split shape mode information, because the length of a side of the square second coding units 1406a, 1406b, 1406c, and 1406d is ½ times the length of a side of the first coding unit 1400, a depth of the second coding units 1406a, 1406b, 1406c, and 1406d may be D+1 which is deeper than the depth D of the first coding unit 1400 by 1.

According to an embodiment, the decoder 120 may determine a plurality of second coding units 1412a and 1412b, and 1414a, 1414b, and 1414c by splitting a first coding unit 1410, a height of which is longer than its width, in a horizontal direction based on the split shape mode information. According to an embodiment, the decoder 120 may determine a plurality of second coding units 1422a and 1422b, and 1424a, 1424b, and 1424c by splitting a first coding unit 1420, a width of which is longer than its height, in a vertical direction based on the split shape mode information.

According to an embodiment, a depth of the second coding units 1412a and 1412b, and 1414a, 1414b, and 1414c, or 1422a and 1422b, and 1424a, 1424b, and 1424c, which are determined based on the split shape mode information of the non-square first coding unit 1410 or 1420, may be determined based on the length of a long side thereof. For example, because the length of a side of the square second coding units 1412a and 1412b is ½ times the length of a long side of the first coding unit 1410 having a non-square shape, a height of which is longer than its width, a depth of the square second coding units 1412*a* and 1412*b* is D+1 which is deeper than the depth D of the non-square first coding unit 1410 by 1.

Furthermore, the decoder 120 may split the non-square first coding unit 1410 into an odd number of second coding units 1414*a*, 1414*b*, and 1414*c* based on the split shape mode information. The odd number of second coding units 1414*a*, 1414*b*, and 1414*c* may include the non-square second coding units 1414*a* and 1414*c* and the square second coding unit 1414*b*. In this case, because the length of a long side of the non-square second coding units 1414*a* and 1414*c* and the length of a side of the square second coding unit 1414*b* are ½ times the length of a long side of the first coding unit 1410, a depth of the second coding units 1414*a*, 1414*b*, and 1414*c* may be D+1 which is deeper than the depth D of the non-square first coding unit 1410 by 1. The decoder 120 may determine depths of coding units split from the first coding unit 1420 having a non-square shape, a width of which is longer than its height, by using the aforementioned method of determining depths of coding units split from the first coding unit 1410.

According to an embodiment, the decoder 120 may determine PIDs for identifying split coding units, based on a size ratio between the coding units when an odd number of split coding units do not have equal sizes. Referring to FIG. 14, a coding unit 1414*b* of a center location among an odd number of split coding units 1414*a*, 1414*b*, and 1414*c* may have a width being equal to that of the other coding units 1414*a* and 1414*c* and a height being twice that of the other coding units 1414*a* and 1414*c*. That is, in this case, the coding unit 1414*b* at the center location may include two of the other coding unit 1414*a* or 1414*c*. Therefore, when a PID of the coding unit 1414*b* at the center location is 1 based on a scan order, a PID of the coding unit 1414*c* located next to the coding unit 1414*b* may be increased by 2 and thus may be 3. That is, discontinuity in PID values may be present. According to an embodiment, the decoder 120 may determine whether an odd number of split coding units do not have equal sizes, based on whether discontinuity is present in PIDs for identifying the split coding units.

According to an embodiment, the decoder 120 may determine whether to use a particular splitting method, based on PID values for identifying a plurality of coding units determined by splitting a current coding unit. Referring to FIG. 14, the decoder 120 may determine an even number of coding units 1412*a* and 1412*b* or an odd number of coding units 1414*a*, 1414*b*, and 1414*c* by splitting the first coding unit 1410 having a rectangular shape, a height of which is longer than its width. The decoder 120 may use PIDs indicating respective coding units so as to identify the respective coding units. According to an embodiment, the PID may be obtained from a sample at a predetermined location of each coding unit (e.g., an upper left sample).

According to an embodiment, the decoder 120 may determine a coding unit at a predetermined location from among the split coding units, by using the PIDs for distinguishing the coding units. According to an embodiment, when the split shape mode information of the first coding unit 1410 having a rectangular shape, a height of which is longer than its width, indicates to split a coding unit into three coding units, the decoder 120 may split the first coding unit 1410 into three coding units 1414*a*, 1414*b*, and 1414*c*. The decoder 120 may assign a PID to each of the three coding units 1414*a*, 1414*b*, and 1414*c*. The decoder 120 may compare PIDs of an odd number of split coding units so as to determine a coding unit at a center location from among the coding units. The decoder 120 may determine the coding unit 1414*b* having a PID corresponding to a middle value among the PIDs of the coding units, as the coding unit at the center location from among the coding units determined by splitting the first coding unit 1410. According to an embodiment, the decoder 120 may determine PIDs for distinguishing split coding units, based on a size ratio between the coding units when the split coding units do not have equal sizes. Referring to FIG. 14, the coding unit 1414*b* generated by splitting the first coding unit 1410 may have a width being equal to that of the other coding units 1414*a* and 1414*c* and a height being twice that of the other coding units 1414*a* and 1414*c*. In this case, when the PID of the coding unit 1414*b* at the center location is 1, the PID of the coding unit 1414*c* located next to the coding unit 1414*b* may be increased by 2 and thus may be 3. When the PID is not uniformly increased as described above, the decoder 120 may determine that a coding unit is split into a plurality of coding units including a coding unit having a size different from that of the other coding units. According to an embodiment, when the split shape mode information indicates to split a coding unit into an odd number of coding units, the decoder 120 may split a current coding unit in such a manner that a coding unit of a predetermined location among an odd number of coding units (e.g., a coding unit of a centre location) has a size different from that of the other coding units. In this case, the decoder 120 may determine the coding unit of the centre location, which has a different size, by using PIDs of the coding units. However, the PIDs and the size or location of the coding unit of the predetermined location are not limited to the aforementioned examples, and various PIDs and various locations and sizes of coding units may be used.

According to an embodiment, the decoder 120 may use a predetermined data unit where a coding unit starts to be recursively split.

Figure 15:
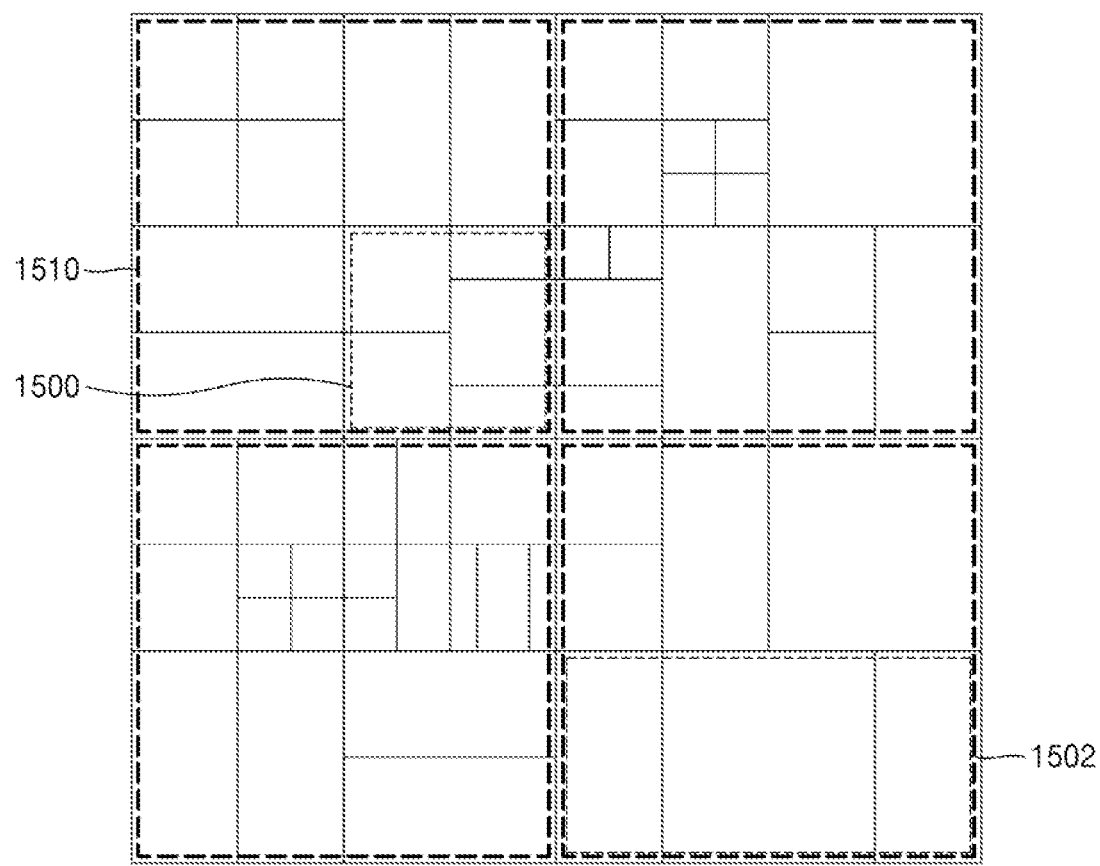
FIG. 15 illustrates that a plurality of coding units are determined based on a plurality of predetermined data units included in an image, according to an embodiment.

FIG. 15 illustrates that a plurality of coding units are determined based on a plurality of predetermined data units included in an image, according to an embodiment.

According to an embodiment, a predetermined data unit may be defined as a data unit where a coding unit starts to be recursively split by using split shape mode information. That is, the predetermined data unit may correspond to a coding unit of an uppermost depth, which is used to determine a plurality of coding units split from a current image. In the following descriptions, for convenience of explanation, the predetermined data unit is referred to as a reference data unit.

According to an embodiment, the reference data unit may have a predetermined size and a predetermined shape. According to an embodiment, the reference data unit may include M×N samples. Herein, M and N may be equal to each other, and may be integers expressed as powers of 2. That is, the reference data unit may have a square or non-square shape, and then may be split into an integer number of coding units.

According to an embodiment, the decoder 120 may split the current image into a plurality of reference data units. According to an embodiment, the decoder 120 may split the plurality of reference data units, which are split from the current image, by using the split shape mode information of each reference data unit. The operation of splitting the reference data unit may correspond to a splitting operation using a quadtree structure.

According to an embodiment, the decoder 120 may previously determine the minimum size allowed for the reference data units included in the current image. Accordingly, the decoder 120 may determine various reference data units having sizes equal to or greater than the minimum size, and may determine one or more coding units by using the split shape mode information with reference to the determined reference data unit.

Referring to FIG. 15, the decoder 120 may use a square reference coding unit 1500 or a non-square reference coding unit 1502. According to an embodiment, the shape and size of reference coding units may be determined based on various data units that may include one or more reference coding units (e.g., sequences, images (pictures), slices, slice segments, tiles, tile groups, largest coding units, or the like).

According to an embodiment, the bitstream obtainer 110 may obtain, from a bitstream, at least one of reference coding unit shape information and reference coding unit size information with respect to each of the various data units. An operation of splitting the square reference coding unit 1500 into one or more coding units has been described above in relation to the operation of splitting the current coding unit 300 of FIG. 3, and an operation of splitting the non-square reference coding unit 1502 into one or more coding units has been described above in relation to the operation of splitting the current coding unit 400 or 450 of FIG. 4. Thus, detailed descriptions thereof will not be provided herein.

According to an embodiment, the decoder 120 may use a PID for identifying the size and shape of reference coding units, to determine the size and shape of reference coding units according to some data units previously determined based on a predetermined condition. That is, the bitstream obtainer 110 may obtain, from the bitstream, only the PID for identifying the size and shape of reference coding units with respect to each slice, slice segment, tile, tile group, or largest coding unit which is a data unit satisfying a predetermined condition (e.g., a data unit having a size equal to or smaller than a slice) among the various data units (e.g., sequences, images (pictures), slices, slice segments, tiles, tile groups, largest coding units, or the like). The decoder 120 may determine the size and shape of reference data units with respect to each data unit, which satisfies the predetermined condition, by using the PID. When the reference coding unit shape information and the reference coding unit size information are obtained and used from the bitstream according to each data unit having a relatively small size, the efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the decoder 120 may determine at least one of the size and shape of reference coding units included in a data unit serving as a unit for obtaining the PID, by selecting the previously determined at least one of the size and shape of reference coding units based on the PID.

According to an embodiment, the decoder 120 may use one or more reference coding units included in a largest coding unit. That is, a largest coding unit split from an image may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the decoder 120 may determine the reference coding units by splitting the largest coding unit n times based on a quadtree structure, and may split the reference coding unit based on at least one of the block shape information and the split shape mode information according to various embodiments.

Figure 16:
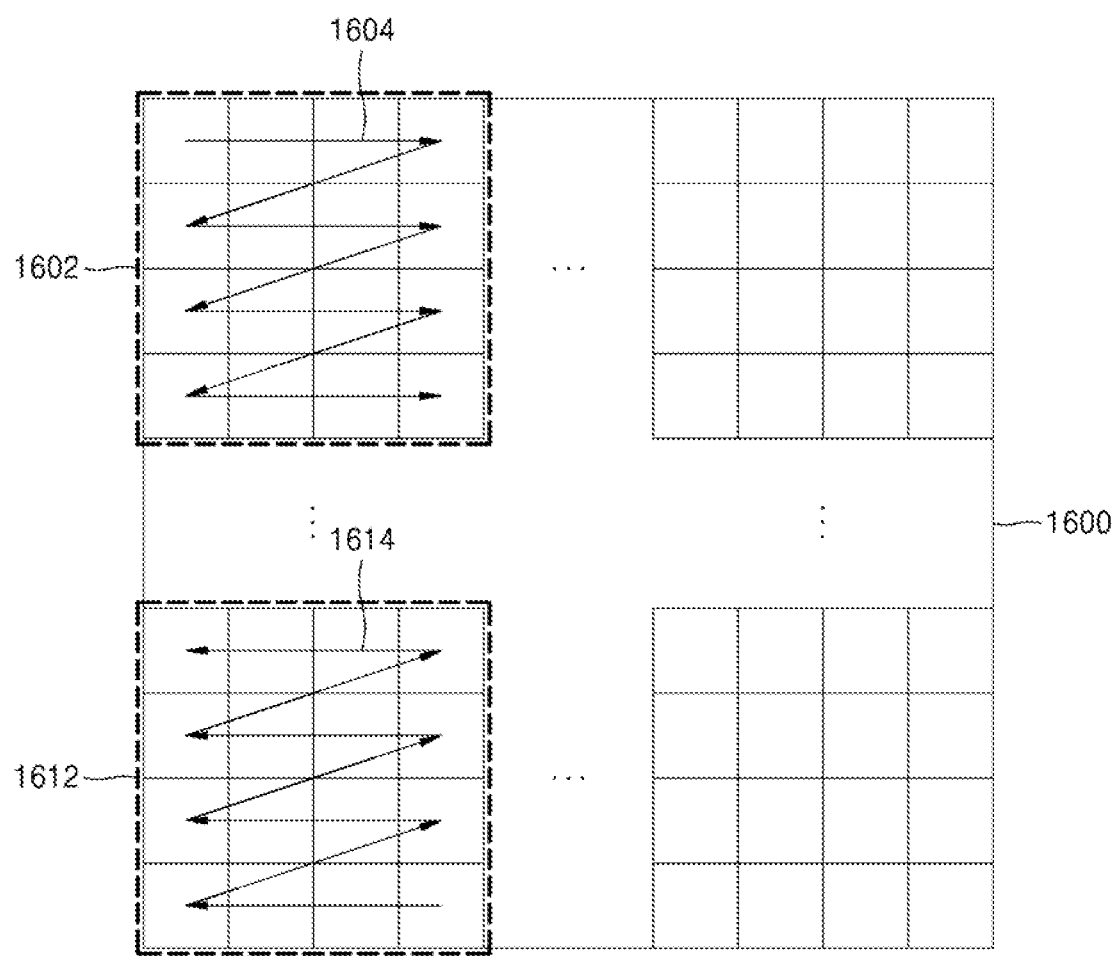
FIG. 16 illustrates a processing block serving as a criterion for determining a determination order of reference coding units included in an image, according to an embodiment.

FIG. 16 illustrates a processing block serving as a criterion for determining a determination order of reference coding units included in an image 1600, according to an embodiment.

According to an embodiment, the decoder 120 may determine one or more processing blocks split from an image. The processing block is a data unit including one or more reference coding units split from a picture, and the one or more reference coding units included in the processing block may be determined according to a particular order. That is, a determination order of one or more reference coding units determined in each of processing blocks may correspond to one of various types of orders for determining reference coding units, and may vary depending on the processing block. The determination order of reference coding units, which is determined with respect to each processing block, may be one of various orders, e.g., raster scan order, Z-scan, N-scan, up-right diagonal scan, horizontal scan, and vertical scan, but is not limited to the aforementioned scan orders.

According to an embodiment, the decoder 120 may obtain processing block size information and may determine the size of one or more processing blocks included in the picture. The decoder 120 may obtain the processing block size information from a bitstream and may determine the size of one or more processing blocks included in the picture. The size of processing blocks may be a predetermined size of data units, which is indicated by the processing block size information.

According to an embodiment, the bitstream obtainer 110 may obtain the processing block size information from the bitstream according to each particular data unit. For example, the processing block size information may be obtained from the bitstream in a data unit such as an image, sequence, image, slice, slice segment, tile, tile group, or the like. That is, the bitstream obtainer 110 may obtain the processing block size information from the bitstream according to each of the various data units, and the decoder 120 may determine the size of one or more processing blocks, which are split from the image, by using the obtained processing block size information. The size of the processing blocks may be integer times that of the reference coding units.

According to an embodiment, the decoder 120 may determine the size of processing blocks 1602 and 1612 included in the image 1600. For example, the decoder 120 may determine the size of processing blocks based on the processing block size information obtained from the bitstream. Referring to FIG. 16, according to an embodiment, the decoder 120 may determine a width of the processing blocks 1602 and 1612 to be four times the width of the reference coding units, and may determine a height of the processing blocks 1602 and 1612 to be four times the height of the reference coding units. The decoder 120 may determine a determination order of one or more reference coding units in one or more processing blocks.

According to an embodiment, the decoder 120 may determine the processing blocks 1602 and 1612, which are included in the image 1600, based on the size of processing blocks, and may determine a determination order of one or more reference coding units in the processing blocks 1602 and 1612. According to an embodiment, determination of reference coding units may include determination of the size of the reference coding units.

According to an embodiment, the decoder 120 may obtain, from the bitstream, determination order information of one or more reference coding units included in one or more processing blocks, and may determine a determination order with respect to one or more reference coding units based on the obtained determination order information. The determination order information may be defined as an order or direction for determining the reference coding units in the processing block. That is, the determination order of reference coding units may be independently determined with respect to each processing block.

According to an embodiment, the decoder 120 may obtain, from the bitstream, the determination order information of reference coding units according to each particular data unit. For example, the bitstream obtainer 110 may obtain the determination order information of reference coding units from the bitstream according to each data unit such as an image, sequence, image, slice, slice segment, tile, tile group, or processing block. Because the determination order information of reference coding units indicates an order for determining reference coding units in a processing block, the determination order information may be obtained with respect to each particular data unit including an integer number of processing blocks.

According to an embodiment, the decoder 120 may determine one or more reference coding units based on the determined determination order.

According to an embodiment, the bitstream obtainer 110 may obtain the determination order information of reference coding units from the bitstream as information related to the processing blocks 1602 and 1612, and the decoder 120 may determine a determination order of one or more reference coding units included in the processing blocks 1602 and 1612 and may determine one or more reference coding units, which are included in the image 1600, based on the determination order. Referring to FIG. 16, the decoder 120 may determine determination orders 1604 and 1614 of one or more reference coding units in the processing blocks 1602 and 1612, respectively. For example, when the determination order information of reference coding units is obtained with respect to each processing block, different types of the determination order information of reference coding units may be obtained for the processing blocks 1602 and 1612. When the determination order 1604 of reference coding units in the processing block 1602 is a raster scan order, reference coding units included in the processing block 1602 may be determined according to a raster scan order. On the contrary, when the determination order 1614 of reference coding units in the other processing block 1612 is a backward raster scan order, reference coding units included in the processing block 1612 may be determined according to the backward raster scan order.

According to an embodiment, the decoder 120 may decode the determined one or more reference coding units. The decoder 120 may decode an image, based on the reference coding units determined as described above. A method of decoding the reference coding units may include various image decoding methods.

According to an embodiment, the decoder 120 may obtain, from the bitstream, block shape information indicating the shape of a current coding unit or split shape mode information indicating a splitting method of the current coding unit, and may use the obtained information. The split shape mode information may be included in the bitstream related to various data units. For example, the decoder 120 may use the split shape mode information included in a sequence parameter set, a picture parameter set, a video parameter set, a slice header, a slice segment header, a tile header, or a tile group header. Furthermore, the decoder 120 may obtain, from the bitstream, a syntax element corresponding to the block shape information or the split shape mode information according to each largest coding unit, each reference coding unit, or each processing block, and may use the obtained syntax element.

Hereinafter, a method of determining a split rule, according to an embodiment of the disclosure will be described in detail.

The decoder 120 may determine a split rule of an image. The split rule may be predetermined between the image decoding apparatus 100 and the image encoding apparatus 200. The decoder 120 may determine the split rule of the image, based on information obtained from a bitstream. The decoder 120 may determine the split rule based on the information obtained from at least one of a sequence parameter set, a picture parameter set, a video parameter set, a slice header, a slice segment header, a tile header, and a tile group header. The decoder 120 may determine the split rule differently according to frames, slices, tiles, temporal layers, largest coding units, or coding units.

The decoder 120 may determine the split rule based on a block shape of a coding unit. The block shape may include a size, a shape, an area, a ratio of width and height, and a direction of the coding unit. The image encoding apparatus 200 and the image decoding apparatus 100 may predetermine the split rule based on the block shape of the coding unit. The decoder 120 may determine the split rule based on the information obtained from the bitstream received from the image encoding apparatus 150.

The shape of the coding unit may include a square and a non-square. When the lengths of the width and height of the coding unit are equal, the decoder 120 may determine the shape of the coding unit to be a square. Also, when the lengths of the width and height of the coding unit are not equal, the decoder 120 may determine the shape of the coding unit to be a non-square.

The size of the coding unit may include various sizes such as 4×4, 8×4, 4×8, 8×8, 16×4, 16×8, and to 256×256. The size of the coding unit may be classified based on the length of a long side of the coding unit, the length of a short side, or the area. The decoder 120 may apply the same split rule to coding units classified as the same group. For example, the decoder 120 may classify coding units having the same lengths of the long sides as having the same size. Also, the decoder 120 may apply the same split rule to coding units having the same lengths of long sides.

The ratio of the width and height of the coding unit may include 1:2, 2:1, 1:4, 4:1, 1:8, 8:1, 1:16, 16:1, 32:1, 1:32, or the like. Also, a direction of the coding unit may include a horizontal direction and a vertical direction. The horizontal direction may indicate a case in which the length of the width of the coding unit is longer than the length of the height thereof. The vertical direction may indicate a case in which the length of the width of the coding unit is shorter than the length of the height thereof.

The decoder 120 may adaptively determine the split rule, based on a split shape of the coding unit. The decoder 120 may differently determine an allowable split shape mode, based on the split shape of the coding unit. For example, the decoder 120 may determine whether splitting is allowed, based on the size of the coding unit. The decoder 120 may determine a split direction according to the size of the coding unit. The decoder 120 may determine an allowable split type, based on the size of the coding unit.

The decoder 120 may compare a predetermined criterion with at least one of a size, a shape, an area, a ratio of width and height, and a direction of the coding unit and then may restrict the split shape of the coding unit to a predetermined split shape. For example, when the size of the coding unit is M×N and the ratio of height and width is 1:4, splitting of the coding unit may not be allowed, only binary horizontal splitting of the coding unit may be allowed, or quad splitting of the coding unit may not be allowed. In this case, the decoder 120 may not parse, from a bitstream, information to determine a split shape allowed for the coding unit. For example, when quad splitting of the coding unit is not allowed, the decoder 120 may not parse information indicating whether to perform quad splitting.

The split rule determined based on the size of the coding unit may be a split rule predetermined between the image encoding apparatus 200 and the image decoding apparatus 100. Also, the decoder 120 may determine the split rule, based on the information obtained from the bitstream.

The decoder 120 may adaptively determine the split rule, based on a location of the coding unit. The decoder 120 may adaptively determine the split rule, based on the location of the coding unit in the image.

Also, the decoder 120 may determine the split rule such that coding units generated via different splitting paths do not have the same block shape. For example, as described with reference to FIG. 10, when quad splitting of the first coding unit 1000 is available, binary horizontal splitting of all of the second coding units 1010a and 1010b that are determined due to binary vertical splitting from the first coding unit 1000 may not be allowed, and binary vertical splitting of all of the second coding units 1020a and 1020b that are determined due to binary horizontal splitting from the first coding unit 1000 may not be allowed. However, the disclosure is not limited thereto, and the coding units generated via different splitting paths may have the same block shape. The coding units generated via the different splitting paths may have different decoding processing orders. Because the decoding processing orders are described above with reference to FIG. 12, details thereof are not provided here.

Figure 17:
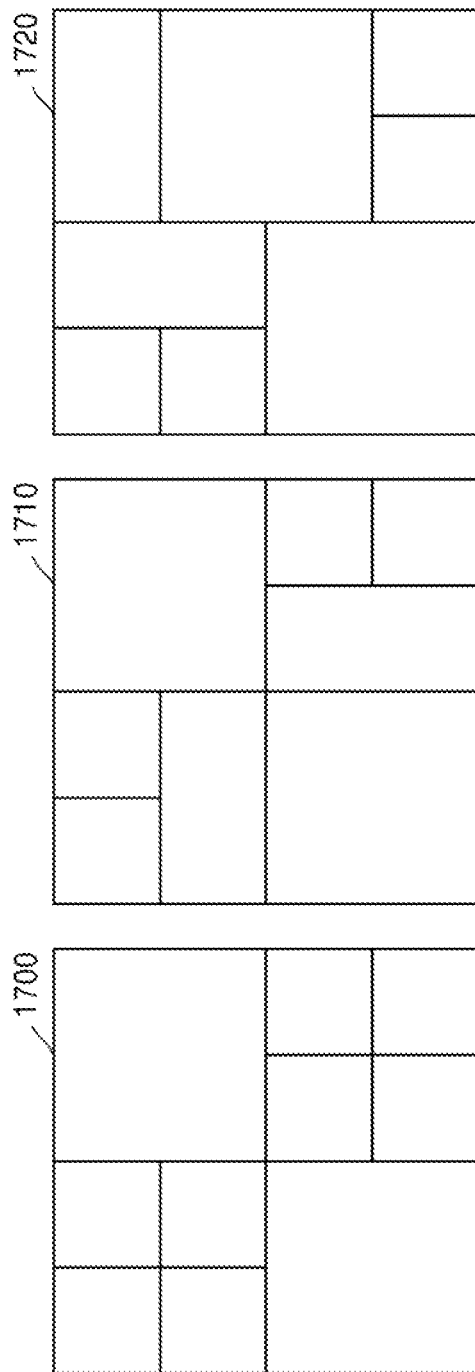
FIG. 17 illustrates coding units that may be determined for each of images when a combination of shapes into which a coding unit is splittable varies in each of the images, according to an embodiment.

FIG. 17 illustrates coding units that may be determined for each of images when a combination of shapes into which a coding unit is splittable varies in each of the images, according to an embodiment.

Referring to FIG. 17, the decoder 120 may differently determine, for each image, a combination of split shapes into which a coding unit is splittable. For example, the decoder 120 may decode an image by using an image 1700 that are splittable into four coding units, an image 1710 that are splittable into two or four coding units, and an image 1720 that are splittable into two, three, or four coding units. In order to split the image 1700 into a plurality of coding units, the decoder 120 may use only split shape information indicating splitting to four square coding units. In order to split the image 1710, the decoder 120 may use only split shape information indicating splitting to two or four square coding units. In order to split the image 1720, the decoder 120 may use only split shape information indicating splitting to two, three, or four coding units. Because combinations of the aforementioned split shapes are only an embodiment to describe an operation of the decoder 120, it should be interpreted that the combinations of the split shapes are not limited to the embodiment, and it should be interpreted that a combination of split shapes of various shapes may be used for each predetermined data unit.

According to an embodiment, the bitstream obtainer 110 may obtain a bitstream including an index indicating a combination of split shape information with respect to each predetermined data unit (e.g., a sequence, an image, a slice, a slice segment, a tile, a tile group, or the like). For example, the bitstream obtainer 110 may obtain an index from a sequence parameter set, a picture parameter set, a slice header, a tile header, or a tile group header, the index indicating a combination of split shape information. The decoder 120 may determine, for each predetermined data unit, a combination of split shapes into which a coding unit is splittable, by using the obtained index, and thus may use a combination of different split shapes for each predetermined data unit.

FIG. 18 illustrates various shapes of a coding unit that may be determined based on split shape mode information that is representable as a binary code.

According to an embodiment, the decoder 120 may split a coding unit into various shapes by using block shape information and split shape mode information which are obtained via the bitstream obtainer 110. A shape into which the coding unit is splittable may correspond to various shapes including shapes described above in the embodiments.

Referring to FIG. 18, based on the split shape mode information, the decoder 120 may split a square coding unit in at least one of a horizontal direction and a vertical direction, and may split a non-square coding unit in a horizontal direction or a vertical direction.

According to an embodiment, when the decoder 120 is allowed to split the square coding unit into four square coding units by splitting the square coding unit in a horizontal direction and a vertical direction, split shapes that are indicatable by the split shape mode information about the square coding unit may be 4. According to an embodiment, the split shape mode information may be represented by a two-digit binary code, and a binary code may be allocated to each split shape. For example, when a coding unit is to not be split, split shape mode information may be represented by (00)b, when the coding unit is to be split in a horizontal direction and a vertical direction, the split shape mode information may be represented by (01)b, when the coding unit is to be split in a horizontal direction, the split shape mode information may be represented by (10)b, and when the coding unit is to be split in a vertical direction, the split shape mode information may be represented by (11)b.

According to an embodiment, when the decoder 120 splits a non-square coding unit in a horizontal direction or a vertical direction, types of a split shape, which are indicatable by the split shape mode information, may be determined based on how many coding units into which the coding unit is to be split. Referring to FIG. 18, the decoder 120 may split the non-square coding unit into three coding units. The decoder 120 may split the coding unit into two coding units, and in this case, the split shape mode information may be represented by (10)b. The decoder 120 may split the coding unit into three coding units, and in this case, the split shape mode information may be represented by (11)b. The decoder 120 may determine to not split the coding unit, and in this case, the split shape mode information may be represented by (0)b. That is, the decoder 120 may not use Fixed Length Coding (FLC) but may use Variable Length Coding (VLC) so as to use a binary code representing the split shape mode information.

According to an embodiment, referring to FIG. 18, a binary code of the split shape mode information indicating that the coding unit is to not be split may be represented by (0)b. In a case where the binary code of the split shape mode information indicating that the coding unit is to not be split is represented by (00)b, the binary code of two-bit split shape mode information has to be all used even when split shape mode information set as (01)b does not exist. However, as illustrated in FIG. 18, when three split shapes of the non-square coding unit are used, the decoder 120 may determine that the coding unit is to not be split, by using one-bit binary code (0)b as the split shape mode information, and thus, the decoder 120 may efficiently use a bitstream. However, it should not be interpreted that the split shapes of the non-square coding unit which are indicated by the split shape mode information are limited to three shapes shown in FIG. 18, and it should be interpreted that the split shapes correspond to various shapes included in the aforementioned embodiments.

Figure 19:
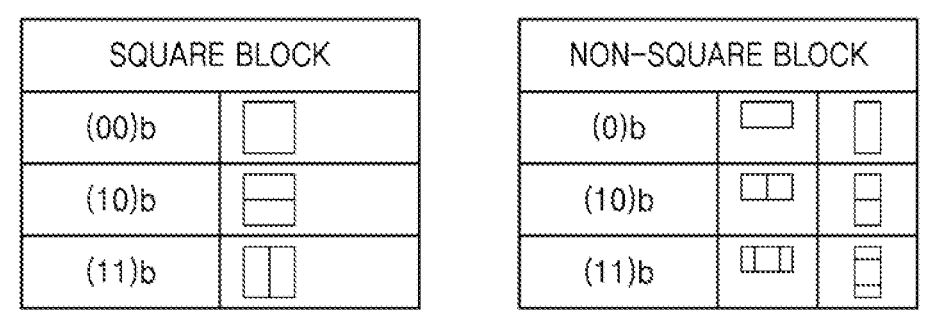

FIG. 19 illustrates other shapes of the coding unit which may be determined based on split shape mode information representable by a binary code, according to an embodiment.

Referring to FIG. 19, based on the split shape mode information, the decoder 120 may split a square coding unit in a horizontal direction or a vertical direction, and may split a non-square coding unit in a horizontal direction or a vertical direction. That is, the split shape mode information may indicate that the square coding unit is to be split in one direction. In this case, a binary code of split shape mode information indicating that the square coding unit is to not be split may be represented by (0)b. In a case where the binary code of the split shape mode information indicating that the coding unit is to not be split is represented by (00)b, the binary code of two-bit split shape mode information has to be all used even when split shape mode information set as (01)b does not exist. However, as illustrated in FIG. 19, when three split shapes of the square coding unit are used, the decoder 120 may determine that the coding unit is to not be split, by using one-bit binary code (0)b as the split shape mode information, and thus, the decoder 120 may efficiently use a bitstream. However, it should not be interpreted that the split shapes of the square coding unit which are indicated by the split shape mode information are limited to three shapes shown in FIG. 19, and it should be interpreted that the split shapes correspond to various shapes included in the aforementioned embodiments.

According to an embodiment, block shape information or split shape mode information may be represented by using a binary code, and this information may be immediately generated as a bitstream. Also, the block shape information or the split shape mode information which is representable by using a binary code may not be immediately generated as a bitstream but may be used as a binary code to be input to context-adaptive binary arithmetic coding (CABAC).

According to an embodiment, a process will now be described, in which the decoder 120 obtains syntax of block shape information or split shape mode information by CABAC. A bitstream including a binary code of the syntax may be obtained via the bitstream obtainer 110. The decoder 120 may inverse-binarize a bin string included in the obtained bitstream and thus may detect a syntax element indicating block shape information or split shape mode information. According to an embodiment, the decoder 120 may obtain a set of binary bin strings corresponding to a syntax element to be decoded and may decode each bin by using probability information. The decoder 120 may repeat until a bin string composed of such decoded bins becomes equal to one of previously-obtained bin strings. The decoder 120 may determine the syntax element by performing inverse-binarization on the bin string.

According to an embodiment, the decoder 120 may determine syntax of the bin string by performing a decoding process of adaptive binary arithmetic coding, and may update a probability model with respect to bins obtained via the bitstream obtainer 110. Referring to FIG. 18, the bitstream obtainer 110 may obtain a bitstream indicating a binary code representing split shape mode information according to an embodiment. The decoder 120 may determine syntax of the split shape mode information by using an obtained binary code having a size of 1 bit or 2 bits. In order to determine the syntax of the split shape mode information, the decoder 120 may update probabilities of respective bits that are 2 bits of the binary code. That is, according to whether a value of a first bin from among 2 bits of the binary code is 0 or 1, the decoder 120 may update a probability that a next bin has a value of 0 or 1 when the next bin is decoded.

According to an embodiment, in a process of determining syntax, the decoder 120 may update probabilities of bins to be used in a process of decoding bins of a bin string of the syntax. The decoder 120 may not update a probability of a particular bit of the bin string and may determine that the particular bit has a same probability.

Referring to FIG. 18, in a process of determining syntax by using a bin string representing the split shape mode information about the non-square coding unit, when the decoder 120 does not split the non-square coding unit, the decoder 120 may determine syntax of the split shape mode information by using one bin having a value of 0. That is, in a case where block shape information indicates that a current coding unit has a non-square shape, a first bin of the bin string representing the split shape mode information may be 0 when the non-square coding unit is to not be split, and may be 1 when being split into two or three coding units. Accordingly, a probability that the first bin of the bin string representing the split shape mode information about the non-square coding unit is to be 0 may be ⅓, and the probability is to be 1 may be ⅔. As described above, because the split shape mode information indicating that the non-square coding unit is to not be split can represent only a bin string of 1 bit having a value of 0, the decoder 120 may determine the syntax of the split shape mode information by determining whether a second bin is 0 or 1 only when the first bin of the split shape mode information is 1. According to an embodiment, when the first bin of the split shape mode information is 1, the decoder 120 may decode the second bin, provided that a probability that the second bin is to be 0 and a probability that the second bin is to be 1 are equal to each other.

According to an embodiment, in a process of determining bins of a bin string representing split shape mode information, the decoder 120 may use various probabilities about each of the bins. According to an embodiment, the decoder 120 may differently determine probabilities of bins representing split shape mode information, according to a direction of a non-square block. According to an embodiment, the decoder 120 may differently determine probabilities of bins representing split shape mode information, according to an area or a length of a long side of a current coding unit. According to an embodiment, the decoder 120 may differently determine probabilities of bins representing split shape mode information, according to at least one of a shape and a length of a long side of a current coding unit.

According to an embodiment, the decoder 120 may determine probabilities of bins representing split shape mode information to be equal, the split shape mode information being about coding units whose sizes are equal to or greater than a predetermined size. For example, probabilities of bins representing split shape mode information about coding units may be determined to be equal, the coding units having sizes that are equal to or greater than 64-sample with respect to a length of a long side of a coding unit.

According to an embodiment, the decoder 120 may determine initial probabilities of bins constituting a bin string of split shape mode information, based on a slice type (e.g., an I-slice, a P-slice, or a B-slice).

According to an embodiment, when the decoder 120 determines split shape mode information of a coding unit, the decoder 120 may independently determine split shape mode information of a luma coding block from split shape mode information of a chroma coding block. For example, when information (e.g., dual_tree_flag) indicating that dual-tree splitting is to be performed is included in a bitstream, the decoder 120 may independently determine the split shape mode information of the luma coding block from the split shape mode information of the chroma coding block. Also, when the information indicating that dual-tree splitting is to be performed is included in the bitstream, and a current slice including a coding unit to be split is an I-slice, the decoder 120 may independently determine the split shape mode information of the luma coding block from the split shape mode information of the chroma coding block.

When information indicating that dual-tree splitting is to not be performed is included in a bitstream, or a current slice including a coding unit is not an I-slice, the decoder 120 may equally determine split shape mode information of a luma coding block and split shape mode information of a chroma coding block (i.e., single-tree splitting).

In an embodiment, in a case where dual-tree splitting is performed, when the decoder 120 splits a luma coding block having a size equal to or smaller than a predetermined size and a chroma coding block corresponding thereto, the decoder 120 may obtain, from a bitstream, split shape mode information of the luma coding block and split shape mode information of the chroma coding block. Then, the decoder 120 may split the luma coding block, based on the split shape mode information of the luma coding block, and may split the chroma coding block, based on the split shape mode information of the chroma coding block. As described above, the luma coding block and the chroma coding block may be recursively split according to quad split, ternary split, binary split, and the like. The predetermined size may be 32×32, 64×64, 128×128, or 256×256, but is not limited thereto. According to an embodiment, while the luma coding block having the size equal to or smaller than the predetermined size and the chroma coding block corresponding thereto are recursively split, when a size of a child coding block of the chroma coding block is equal to or smaller than a predetermined minimum size, splitting of the chroma coding block corresponding to a parent coding block may not be allowed. Also, according to an embodiment, when the luma coding block having the size equal to or smaller than the predetermined size and the chroma coding block corresponding thereto are split, a maximum depth of a chroma coding block to be generated as a result of splitting may be less than a maximum depth of a luma coding block to be generated as the result of splitting.

In a case where dual-tree splitting is performed, when the decoder 120 splits a luma coding block having a size greater than a predetermined size (e.g., 64×64) and a chroma coding block corresponding thereto, the decoder 120 may split the luma coding block and the chroma coding block, according to a predetermined coding mode, e.g., a quad split mode. In this case, the luma coding block and the chroma coding block may be split into a same shape. As another example, the decoder 120 may obtain, from a bitstream, split shape mode information of the luma coding block having the size greater than the predetermined size (e.g., 64×64), and may split the luma coding block and the chroma coding block, based on the split shape mode information of the luma coding block. That is, the luma coding block greater than the predetermined size and the chroma coding block corresponding thereto may be split into a same shape, based on the split shape mode information of the luma coding block. When a luma coding block equal to or smaller than the predetermined size and a chroma coding block corresponding thereto are determined as a result of splitting with respect to the luma coding block having the size greater than the predetermined size (e.g., 64×64) and the chroma coding block corresponding thereto, the luma coding block equal to or smaller than the predetermined size and the chroma coding block corresponding thereto may be independently split, based on split shape mode information of the luma coding block and split shape mode information of the chroma coding block as described above.

In another embodiment, in a case where dual-tree splitting is performed, when the decoder 120 splits a luma coding block of a depth equal to or greater than a predetermined depth and a chroma coding block corresponding thereto, the decoder 120 may obtain, from a bitstream, split shape mode information of the luma coding block and split shape mode information of the chroma coding block. Then, the decoder 120 may split the luma coding block, based on the split shape mode information of the luma coding block, and may split the chroma coding block, based on the split shape mode information of the chroma coding block. According to an embodiment, while the luma coding block of the depth equal to or greater than the predetermined depth and the chroma coding block corresponding thereto are recursively split, when a size of a child coding block of the chroma coding block is equal to or smaller than a predetermined minimum size, splitting of the chroma coding block corresponding to a parent coding block may not be allowed. Also, according to an embodiment, when the luma coding block of the depth equal to or greater than the predetermined depth and the chroma coding block corresponding thereto are split, a maximum depth of a chroma coding block to be generated as a result of splitting may be less than a maximum depth of a luma coding block to be generated as the result of splitting.

In a case where dual-tree splitting is performed, when the decoder 120 splits a luma coding block of a depth less than the predetermined depth and a chroma coding block corresponding thereto, the decoder 120 may split the luma coding block and the chroma coding block, according to a predetermined coding mode, e.g., a quad split mode. As another example, the decoder 120 may obtain, from a bitstream, split shape mode information of the luma coding block of the depth less than the predetermined depth. Then, the decoder 120 may equally split the luma coding block and the chroma coding block, based on the split shape mode information of the luma coding block.

In another embodiment, in a case where dual-tree splitting is performed, when the decoder 120 splits a luma coding block of a size equal to or smaller than a predetermined size or of a depth equal to or greater than a predetermined depth and a chroma coding block corresponding thereto, the decoder 120 may obtain split shape mode information of the luma coding block from the bitstream, may split the luma coding block according to the split shape mode information of the luma coding block, and may split the chroma coding block according to a predetermined split mode, regardless of the split shape mode information of the luma coding block.

When the decoder 120 splits a luma coding block of a size greater than the predetermined size or of a depth less than the predetermined depth and a chroma coding block corresponding thereto, the decoder 120 may split the luma coding block and the chroma coding block according to the predetermined split mode, or may equally split the luma coding block and the chroma coding block according to the split shape mode information of the luma coding block.

In another embodiment, in a case where dual-tree splitting is performed, when the decoder 120 splits a luma coding block of a size equal to or smaller than a predetermined size or of a depth equal to or greater than a predetermined depth and a chroma coding block corresponding thereto, the decoder 120 may obtain split shape mode information of the luma coding block from the bitstream, and may equally split the luma coding block and the chroma coding block according to the split shape mode information of the luma coding block. In this regard, when a size of a child coding block of the chroma coding block is equal to or smaller than a minimum size, the child coding block being determined when the chroma coding block is split according to a split shape determined based on the split shape mode information, splitting of the chroma coding block corresponding to a parent coding block may not be allowed.

Figure 20:
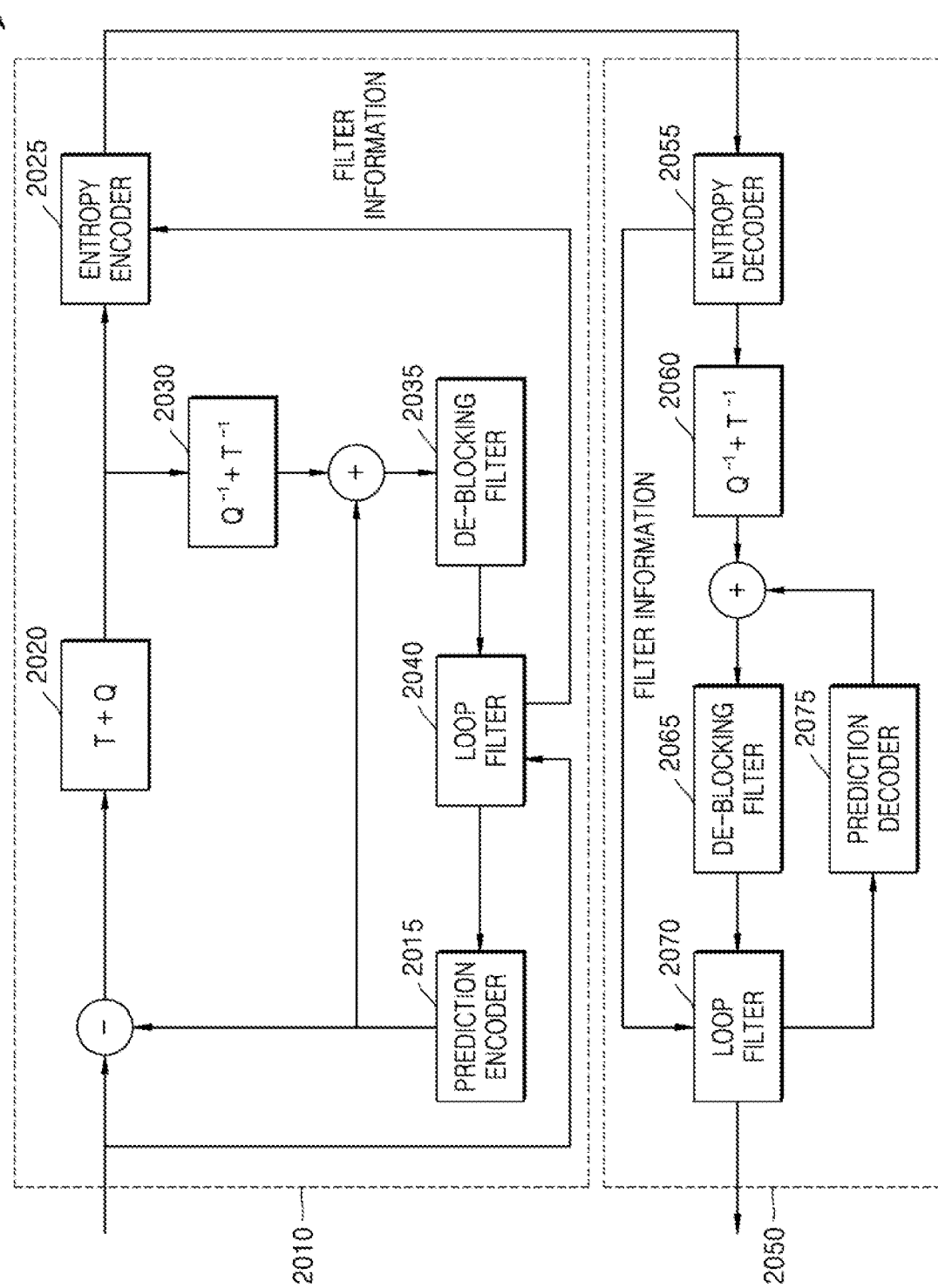
FIG. 20 is a block diagram of an image encoding and decoding system for performing loop filtering.

FIG. 20 is a block diagram of an image encoding and decoding system for performing loop filtering.

An encoding terminal 2010 of an image encoding and decoding system 2000 transmits an encoded bitstream of an image, and a decoding terminal 2050 outputs a reconstructed image by receiving and then decoding the bitstream. In this regard, the encoding terminal 2010 may correspond to the image encoding apparatus 200 to be described below, and the decoding terminal 2050 may correspond to the image decoding apparatus 100.

In the encoding terminal 2010, a prediction encoder 2015 outputs prediction data by performing inter prediction and intra prediction on a coding unit, and a transformer and quantizer 2020 transforms residual data between the prediction data and a current input image, based on a transform unit, and quantizes and then outputs a transform coefficient. An entropy encoder 2025 encodes the quantized transform coefficient and then outputs the entropy-encoded transform coefficient as a bitstream. The quantized transform coefficient is reconstructed as a data in a spatial domain after passing through an inverse-quantizer and inverse-transformer 2030, and the reconstructed data in the spatial domain is output as a reconstructed image after passing through a de-blocking filter 2035 and a loop filter 2040. The reconstructed image may pass through the prediction encoder 2015 and then may be used as a reference image for a next input image.

Encoded image data in a bitstream received by the decoding terminal 2050 may pass through an entropy decoder 2055 and an inverse-quantizer and inverse-transformer 2060 and then may be reconstructed to residual data in a spatial domain. Prediction data, which is output from a prediction decoder 2075, and the residual data are combined to constitute image data in the spatial domain, and a de-blocking filter 2065 and a loop filter 2070 may output a reconstructed image of a current original image by performing filtering on the image data in the spatial domain. The reconstructed image may be used, by the prediction decoder 2075, as a reference image for a next original image The loop filter 2040 of the encoding terminal 2010 performs loop filtering by using filter information that is user-input or is input according to system configuration. The filter information used by the loop filter 2040 is output to the entropy encoder 2025, and thus, the encoded image data and the filter information are transmitted together to the decoding terminal 2050. The loop filter 2070 of the decoding terminal 2050 may perform loop filtering, based on the filter information input from the entropy decoder 2055.

As described above, inverse transformation of the transform coefficient may be performed based on the transform unit. A width or height of the transform unit determined based on a coding unit according to various split shape modes may not correspond to $2^n$ (where n is an integer). In other words, the number of samples arrayed in a transverse direction or longitudinal direction of the transform unit may not correspond to $2^n$. When a width and height of a transform kernel for inverse-transforming a transform coefficient included in the transform unit correspond to $2^n$, the transform kernel cannot be used in inverse-transformation with respect to the transform unit whose width or height does not correspond to $2^n$. In this case, a transform kernel whose width or height corresponds to $2^n$ is requested, and this increases the complexity of transformation and inverse-transformation.

In an embodiment, when a width or height of a current transform unit does not correspond to $2^n$, the decoder 120 may perform inverse transformation, based on a coding unit including the current transform unit. In other words, the current transform unit may be determined from a current coding unit, and when a width or height of the current transform unit does not correspond to $2^n$, the decoder 120 may inverse transform a transform coefficient included in the current coding unit. When a width or height of the coding unit including the current coding unit does not correspond to $2^n$, the decoder 120 may inverse transform transform coefficients, based on a parent coding unit of the coding unit.

In an embodiment, when a width or height of the current coding unit does not correspond to $2^n$, the decoder 120 may determine a prediction mode of the current coding unit to be a prediction mode that does not require inverse transformation, the current coding unit including the current transform unit. For example, a prediction mode of the current coding unit may be determined to be a skip mode, a merge skip mode, or an affine skip mode. When a width or height of the current transform unit does not correspond to $2^n$, the decoder 120 may not obtain prediction mode information of the current coding unit from a bitstream, and may determine the prediction mode of the current coding unit to be a skip mode, a merge skip mode, or an affine skip mode. Determining the prediction mode of the current coding unit to be a prediction mode that does not require inverse transformation, the current coding unit including the current transform unit, may be useful when inverse transformation is performed based on a coding unit. That is, when a width or height of the current coding unit that is determined via a recursive splitting process does not correspond to 2', the decoder 120 may determine the prediction mode of the current coding unit to be a prediction mode that does not require inverse transformation.

Also, in an embodiment, when a width or height of the current transform unit does not correspond to 2', the decoder 120 may determine that inverse transformation is not necessary for the current transform unit. The decoder 120 may not obtain, from the bitstream, information (e.g., transform skip flag) indicating whether inverse transformation is necessary for the current transform unit, and may determine that inverse transformation is not necessary for the current transform unit. In this case, quantized residual data may be included in the bitstream, and the decoder 120 may obtain residual data in a spatial domain by inverse quantizing the quantized residual data.

Also, in an embodiment, when a width or height of the current transform unit does not correspond to 2', the decoder 120 may determine values of transform coefficients included in the current transform unit to be 0. The decoder 120 may not obtain, from the bitstream, information (e.g., tu_cbf) indicating whether a non-zero transform coefficient is included in the current transform unit, and may determine all the values of the transform coefficients included in the current transform unit to be 0.

Also, in an embodiment, when a width or height of the current transform unit does not correspond to 2', the decoder 120 may determine transform coefficients of the current transform unit to be a DC value obtained from the bitstream. The DC value may be an average value of the transform coefficients included in the current transform unit. The decoder 120 may not inverse transform the current transform unit and may determine a value of the transform coefficients of the current transform unit to be the DC value obtained from the bitstream.

Figure 21:
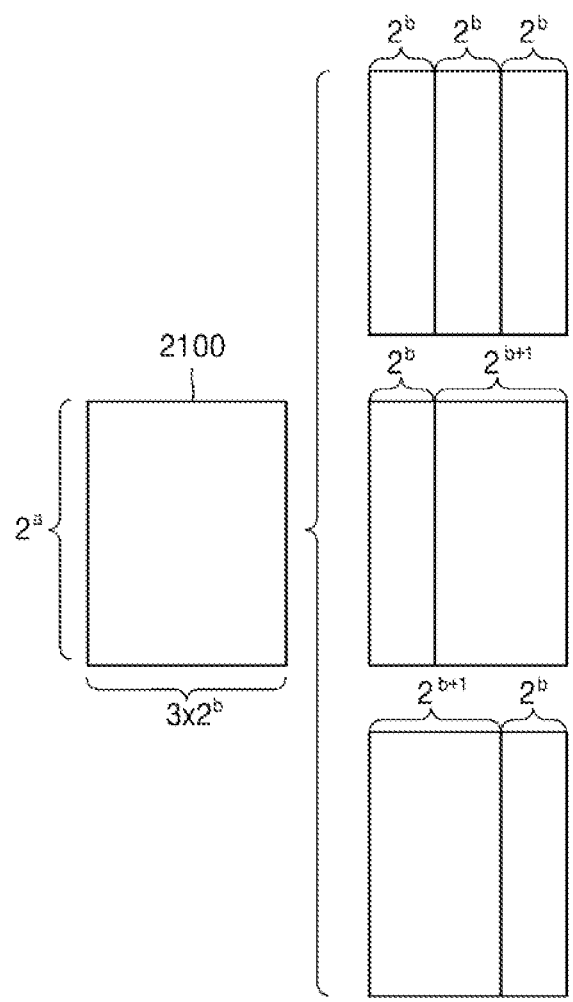
FIG. 21 is a diagram for describing a method of splitting a coding unit, according to an embodiment.

Also, in an embodiment, as illustrated in FIG. 21, when a width (3×2b) or height ($2^a$) of a current coding unit 2100 does not correspond to $2^n$, the decoder 120 may split a current coding unit to allow a width and height of a child coding unit to correspond to $2^n$. As the width and height of the child coding unit correspond to $2^n$, a width and height of a transform unit determined from the child coding unit may also correspond to $2^n$.

Figure 22:
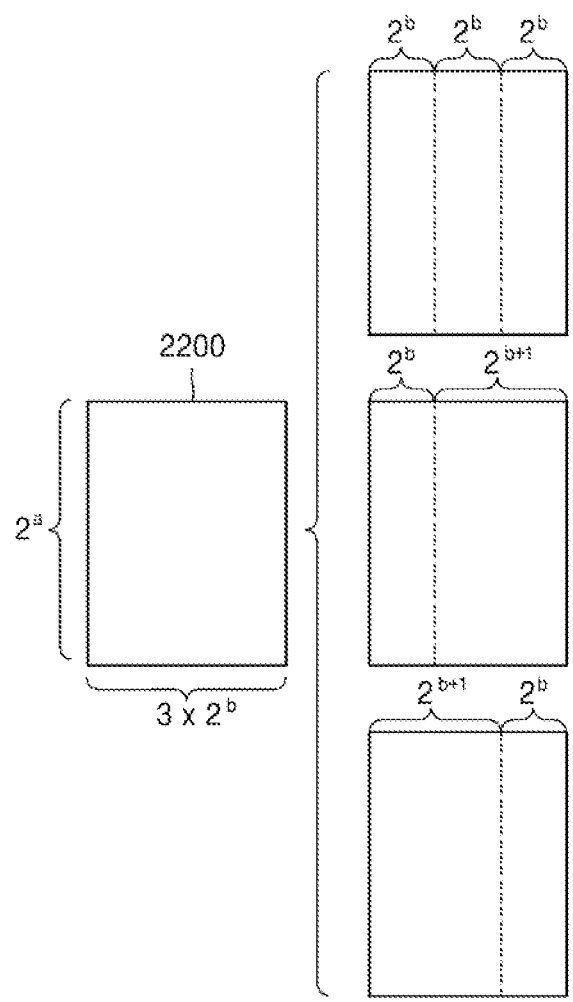
FIG. 22 is a diagram for describing a method of determining a transform unit from a coding unit, according to an embodiment.

Also, in an embodiment, as illustrated in FIG. 22, when a width ($3\times2^b$) or height ($2^a$) of a current coding unit 2200 does not correspond to $2^n$, the decoder 120 may determine, from a current coding unit, transform units whose width and height correspond to $2^n$.

Various embodiments described above are related to operations of an image decoding method performed by the image decoding apparatus 100. Hereinafter, operations of the image encoding apparatus 200 that performs an image encoding method corresponding to an inverse procedure of the image decoding method will now be described according to various embodiments.

Figure 2:
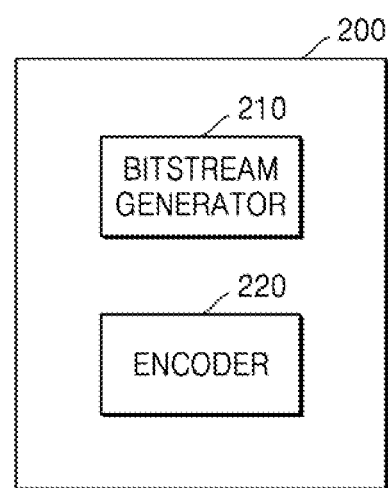
FIG. 2 is a block diagram of an image encoding apparatus, according to an embodiment.

FIG. 2 is a block diagram of the image encoding apparatus 200 capable of encoding an image, based on at least one of block shape information and split shape mode information, according to an embodiment.

The image encoding apparatus 200 may include the encoder 220 and a bitstream generator 210. The encoder 220 may receive an input image and then may encode the input image. The encoder 220 may obtain at least one syntax element by encoding the input image. The syntax element may include at least one of skip flag, prediction mode, motion vector difference, motion vector prediction method (or index), transform quantized coefficient, coded block pattern, coded block flag, intra prediction mode, direct flag, merge flag, delta QP, reference index, prediction direction, transform index, and dual tree flag. The encoder 220 may determine a context model, based on block shape information including at least one of a shape, a direction, a ratio of a width and height, or a size which is of a coding unit.

The bitstream generator 210 may generate a bitstream, based on the encoded input image. For example, the bitstream generator 210 may generate the bitstream by entropy encoding the syntax element, based on the context model. Also, the image encoding apparatus 200 may transmit the bitstream to the image decoding apparatus 100.

According to an embodiment, the encoder 220 of the image encoding apparatus 200 may determine the shape of the coding unit. For example, the coding unit may have a square shape or a non-square shape, and information indicating such shape may be included in the block shape information.

According to an embodiment, the encoder 220 may determine into which shape the coding unit is to be split. The encoder 220 may determine a shape of at least one coding unit to be included in the coding unit, and the bitstream generator 210 may generate the bitstream including split shape mode information including information about a shape of the coding unit. The encoder 220 may determine whether dual tree split is to be performed on the coding unit, and the bitstream generator 210 may generate the bitstream including corresponding information.

According to an embodiment, the encoder 220 may determine whether the coding unit is to be split or is to not be split. When the encoder 220 determines that only one coding unit is included in the coding unit or the coding unit is to not be split, the bitstream generator 210 may generate a bitstream including split shape mode information indicating that the coding unit is to not be split. Also, when the encoder 220 determines that the coding unit is to be split into a plurality of coding units, the bitstream generator 210 may generate a bitstream including split shape mode information indicating that the coding unit is to be split into a plurality of coding units.

According to an embodiment, information indicating a number into which the coding unit is to be split or indicating in which direction the coding unit is to be split may be included in the split shape mode information. For example, the split shape mode information may indicate that splitting is to be performed in at least one direction from among a vertical direction and a horizontal direction or may indicate that splitting is to not be performed.

An image splitting process by the encoder 220 may correspond to an image splitting process by the image decoding apparatus 100 which is described with reference to FIGS. 3 to 22, and thus detailed descriptions thereof are omitted here. However, when a split shape of the coding unit is restricted to a predetermined split shape according to a split rule, splitting of the coding unit is not allowed, or a split shape of the coding unit is allowed to only a split shape other than the predetermined split shape, the bitstream generator 210 may not add information thereof to the bitstream. For example, when the split shape of the coding unit is restricted to horizontal split, split direction information indicating a horizontal direction or a vertical direction may not be included in the bitstream. Also, when the split shape of the coding unit is restricted to binary split, split type information indicating binary split or ternary split may not be included in the bitstream. Also, when splitting of the coding unit is not allowed, information indicating whether to split the coding unit may not be included in the bitstream. That is, when the split shape of the coding unit conforms with a split rule that is predetermined in the image decoding apparatus 100 and the image encoding apparatus 200, information necessary to determine a split shape mode based on the split rule may not be included in the bitstream.

Also, in an embodiment, when a prediction mode of the coding unit is restricted to a predetermined prediction mode, based on a predetermined rule, the bitstream generator 210 may not add information indicating the prediction mode of the coding unit to the bitstream. For example, the prediction mode of the coding unit is determined as a mode (e.g., a skip mode, a merge skip mode, or an affine skip mode) of restricting inverse-transformation of a transform coefficient, information (e.g., transform skip flag) indicating whether inverse-transformation of a current transform unit is necessary may not be included in the bitstream.

Also, in an embodiment, when a width or height of the current transform unit does not correspond to $2^n$, information (e.g., tu_cbf) indicating whether a non-zero transform coefficient is included in the current transform unit may not be included in the bitstream.

Also, in an embodiment, when a width or height of the current transform unit does not correspond to $2^n$, the bitstream generator 210 may add an average value of transform coefficients of the current transform unit to the bitstream.

The encoder 220 determines split shape mode information, based on the split shape mode of the coding unit. The encoder 220 determines a context model, based on block shape information including at least one of a shape, a direction, a ratio of a width and height, or a size which is of a coding unit. Then, the bitstream generator 210 may generate, as a bitstream, the split shape mode information for splitting the coding unit, based on the context model.

In order to determine the context model, the encoder 220 may obtain an arrangement to match index of the context model with at least one of the shape, the direction, the ratio of the width and height, or the size which is of the coding unit. The encoder 220 may obtain, from the arrangement, the index of the context model, based on at least one of the shape, the direction, the ratio of the width and height, or the size which is of the coding unit. The encoder 220 may determine the context model, based on the index of the context model.

In order to determine the context model, the encoder 220 may determine the context model, further based on block shape information including at least one of a shape, a direction, a ratio of a width and height, or a size which is of a neighboring coding unit adjacent to the coding unit. Also, the neighboring coding unit may include at least one of coding units located in the lower left side, the left side, the up left side, the top side, the up right side, the right side, or the lower right side.

In order to determine the context model, the encoder 220 may compare a length of a width of a top neighboring coding unit with a length of a width of the coding unit. Also, the encoder 220 may compare lengths of heights of left and right neighboring coding units with a length of a height of the coding unit. Also, the image encoding apparatus 200 may determine the context model, based on results of the comparisons.

Operations of the image encoding apparatus 200 include similar contents with operations of the image decoding apparatus 100 described with reference to FIGS. 3 to 22, and thus detailed descriptions thereof are omitted.

Figure 23:
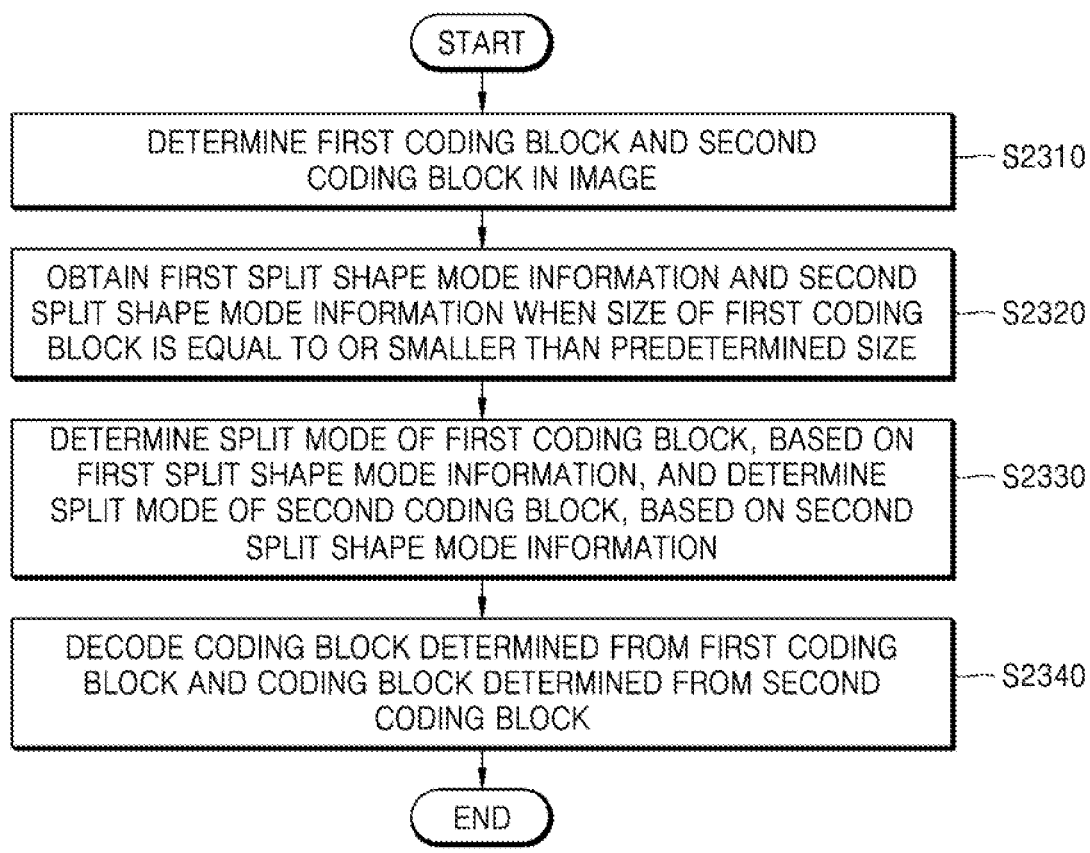
FIG. 23 is a flowchart for describing an image decoding method according to an embodiment.

FIG. 23 is a flowchart for describing an image decoding method according to an embodiment.

In operation S2310, the image decoding apparatus 100 determines a first coding block of a first color component and a second coding block of a second color component which corresponds to the first coding block, which are split from an image. The first color component may be luma, and the second color component may be chroma. As described above, a luma coding block and a chroma coding block may be included in a coding unit. When a ratio of Y:Cb:Cr is 4:2:0 according to a color format, a size of the chroma coding block may be half of a size of the luma coding block.

In operation S2320, when a size of the first coding block is equal to or smaller than a predetermined size, the image decoding apparatus 100 obtains, from a bitstream, first split shape mode information about the first coding block and second split shape mode information about the second coding block. The first split shape mode information and the second split shape mode information may include at least one of information indicating whether splitting is to be performed, information indicating whether quad splitting is to be performed, split type information, and split direction information.

In operation S2330, the image decoding apparatus 100 determines a split mode of the first coding block, based on the first split shape mode information, and determines a split mode of the second coding block, based on the second split shape mode information. The split mode may include no split, quad split, binary vertical split, binary horizontal split, ternary vertical split, or ternary horizontal split. As described above, the split modes of the first coding block and the second coding block may be restricted based on at least one of a block shape, a split mode of a parent coding block, and a split shape of a child coding block.

In operation S2340, the image decoding apparatus 100 decodes, based on information obtained from the bitstream, a coding block of the first color component which is determined based on the split mode of the first coding block and a coding block of the second color component which is determined based on the split mode of the second coding block. A size of the coding block of the first color component may be equal to or smaller than the size of the first coding block, and a size of the coding block of the second color component may be equal to or smaller than the size of the second coding block.

The image decoding apparatus 100 may generate prediction data of the coding block of the first color component and the coding block of the second color component, based on prediction mode information obtained from the bitstream. The image decoding apparatus 100 may inverse transform and de-quantize residual data obtained from the bitstream, and then may add the prediction data thereto, thereby decoding the coding block of the first color component and the coding block of the second color component. The residual data may not be included in the bitstream, according to a prediction mode, and in this case, the coding block of the first color component and the coding block of the second color component may be decoded based on the prediction data.

In an embodiment, the image decoding apparatus 100 may independently and hierarchically split the coding block of the first color component and the coding block of the second color component, based on split shape mode information obtained from the bitstream.

In an embodiment, operations S2320 to S2340 illustrated in FIG. 23 may be performed when a depth of the first coding block is equal to or greater than a predetermined depth.

Also, when the size of the first coding block is greater than a predetermined size (or the depth is smaller than the predetermined depth), the image decoding apparatus 100 may equally split the first coding block and the second coding block, according to a predetermined split mode.

Figure 24:
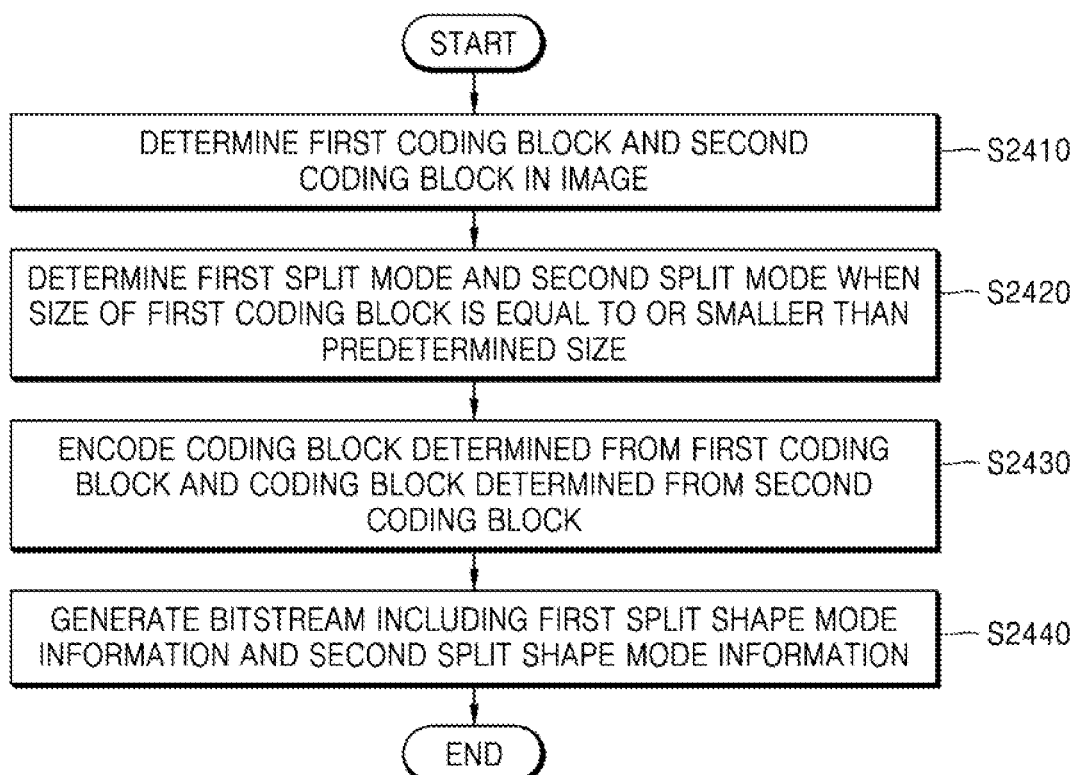
FIG. 24 is a flowchart for describing an image encoding method according to an embodiment.

FIG. 24 is a flowchart for describing an image encoding method according to an embodiment.

In operation S2410, the image encoding apparatus 200 determines a first coding block of a first color component and a second coding block of a second color component which corresponds to the first coding block, which are split from an image. The first color component may be luma, and the second color component may be chroma.

In operation S2420, when a size of the first coding block is equal to or smaller than a predetermined size, the image encoding apparatus 200 determines a first split mode of the first coding block and a second split mode of the second coding block. The image encoding apparatus 200 may independently determine the first split mode and the second split mode.

In operation S2430, the image encoding apparatus 200 encodes a coding block of the first color component which is determined from the first coding block based on the first split mode and a coding block of the second color component which is determined from the second coding block based on the second split mode.

The image encoding apparatus 200 may determine a prediction mode of the coding block of the first color component and the coding block of the second color component, and may generate prediction data, according to the prediction mode. Then, the image encoding apparatus 200 may determine residual data between sample values of the coding block of the first color component and the coding block of the second color component and the prediction data, and may transform and quantize the residual data. Information related to quantized transform coefficients may be entropy encoded and then added to a bitstream.

In operation S2440, the image encoding apparatus 200 generates the bitstream including first split shape mode information about the first coding block and second split shape mode information about the second coding block.

In an embodiment, operations S2420 to S2440 illustrated in FIG. 24 may be performed when a depth of the first coding block is equal to or greater than a predetermined depth.

Also, when the size of the first coding block is greater than a predetermined size (or the depth is equal to or smaller than the predetermined depth), the image decoding apparatus 200 may equally split the first coding block and the second coding block, according to a predetermined split mode.

The embodiments of the disclosure described above may be written as computer-executable programs that may be stored in a medium.

The medium may continuously store the computer-executable programs, or may temporarily store the computer-executable programs for execution or downloading. Also, the medium may be any one of various recording media or storage media in which a single item or plurality of items of hardware are combined, and the medium is not limited to a medium directly connected to a computer system but may be distributed on a network. Examples of the medium include magnetic media such as a hard disk, a floppy disk, and a magnetic tape, optical recording media such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

While one or more embodiments of the disclosure are described in detail with reference to exemplary embodiments above, it will be understood by one of ordinary skill in the art that the disclosure is not limited to the embodiments, and various changes in form and details may be made therein without departing from the spirit and scope of the disclosure.

The invention claimed is:

1. An image decoding method comprising:
obtaining, from a bitstream, information indicating whether a first coding block of a first color component and a second coding block of a second color component are split according to two separate trees;
when the obtained information indicating whether the first coding block and the second coding block are split according to the two separate trees indicates that the first coding block and the second coding block are split according to the two separate trees, and when a size of the first coding block is equal to or smaller than a predetermined size, obtaining, from the bitstream, first split shape mode information about the first coding block and second split shape mode information about the second coding block;
splitting the first coding block according to a first split mode determined from the first split shape mode information;
splitting the second coding block according to a second split mode determined from the second split shape mode information;
decoding a third coding block obtained as a result of splitting the first coding block based on information obtained from the bitstream; and
decoding a fourth coding block obtained as a result of splitting the second coding block based on information obtained from the bitstream,
wherein when the obtained information indicating whether the first coding block and the second coding block are split according to the two separate trees indicates that the first coding block and the second coding block are not split according to the two separate trees, third split shape mode information is obtained from the bitstream, and the first coding block and the second coding block are split according to a third split mode determined from the third split shape mode information, and
wherein when the obtained information indicating whether the first coding block and the second coding block are split according to the two separate trees indicates that the first coding block and the second coding block are split according to the two separate trees, and when the size of the first coding block is greater than the predetermined size, the first coding block and the second coding block are split according to a predetermined split mode.

2. An image encoding method comprising:
determining whether to split a first coding block of a first color component and a second coding block of a second color component according to two separate trees;
when it is determined to split the first coding block and the second coding block according to the two separate trees, and when a size of the first coding block is equal to or smaller than a predetermined size, splitting the first coding block according to a first split mode, and splitting the second coding block according to a second split mode;
encoding a third coding block obtained as a result of splitting the first coding block;
encoding a fourth coding block obtained as a result of splitting the second coding block; and
generating a bitstream comprising information indicating whether the first coding block and the second coding block are split according to the two separate trees, first split shape mode information indicating the first split mode, second split shape mode information indicating the second split mode, a result of encoding the third coding block, and a result of encoding the fourth coding block, wherein when it is determined not to split the first coding block and the second coding block according to the two separate trees, the first coding block and the second coding block are split according to a third split mode, and third split shape mode information indicating the third split mode is comprised in the bitstream, and wherein when it is determined to split the first coding block and the second coding block according to the two separate trees, and when the size of the first coding block is greater than the predetermined size, the first coding block and the second coding block are split according to a predetermined split mode.

3. A method for transmitting a bitstream generated by an image encoding method, wherein the method comprises transmitting the bitstream, wherein the image encoding method comprises:

determining whether to split a first coding block of a first color component and a second coding block of a second color component according to two separate trees;

when it is determined to split the first coding block and the second coding block according to the two separate trees, and when a size of the first coding block is equal to or smaller than a predetermined size, splitting the first coding block according to a first split mode, and splitting the second coding block according to a second split mode;

encoding a third coding block obtained as a result of splitting the first coding block;

encoding a fourth coding block obtained as a result of splitting the second coding block; and generating the bitstream comprising information indicating whether the first coding block and the second coding block are split according to the two separate trees, first split shape mode information indicating the first split mode, second split shape mode information indicating the second split mode, a result of encoding the third coding block, and a result of encoding the fourth coding block, wherein when it is determined not to split the first coding block and the second coding block according to the two separate trees, the first coding block and the second coding block are split according to a third split mode, and third split shape mode information indicating the third split mode is comprised in the bitstream, and wherein when it is determined to split the first coding block and the second coding block according to the two separate trees, and when the size of the first coding block is greater than the predetermined size, the first coding block and the second coding block are split according to a predetermined split mode.

* * * * *